(12) United States Patent
Igarashi et al.

(10) Patent No.: US 11,866,613 B2
(45) Date of Patent: Jan. 9, 2024

(54) PRESSURE-SENSITIVE ADHESIVE SHEET

(71) Applicant: NITTO DENKO CORPORATION, Ibaraki (JP)

(72) Inventors: Takeshi Igarashi, Ibaraki (JP); Yasunori Yamamoto, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 1067 days.

(21) Appl. No.: 16/394,131

(22) Filed: Apr. 25, 2019

(65) Prior Publication Data

US 2019/0249041 A1   Aug. 15, 2019

Related U.S. Application Data

(62) Division of application No. 15/649,708, filed on Jul. 14, 2017, now abandoned.

(30) Foreign Application Priority Data

Jul. 20, 2016   (JP) .................................. 2016-142776

(51) Int. Cl.
C09J 123/06   (2006.01)
C09J 7/38   (2018.01)
(Continued)

(52) U.S. Cl.
CPC ............. *C09J 123/06* (2013.01); *C09J 7/241* (2018.01); *C09J 7/38* (2018.01); *C09J 7/40* (2018.01);
(Continued)

(58) Field of Classification Search
CPC ..... B32B 37/12; B32B 38/10; C08G 2170/40; C09J 123/06; C09J 123/0853;
(Continued)

(56) References Cited

U.S. PATENT DOCUMENTS 2,484,938 A * 10/1949 Ebel ........................... C09J 7/38
 524/270
4,710,754 A * 12/1987 Montean ............ G08B 13/2437
 148/121

(Continued)

FOREIGN PATENT DOCUMENTS

CN   202081055 U   12/2011
GB   2155813 A * 10/1985 ............ C09J 7/0246
(Continued)

OTHER PUBLICATIONS

English translation of abstract of JP2018-021181.*
(Continued)

*Primary Examiner* — Sonya M Sengupta
(74) *Attorney, Agent, or Firm* — Sughrue Mion, PLLC

(57) ABSTRACT

Provided is a PSA sheet that allows installation of a protection sheet with good shape precision on the surface of an object to be protected. The PSA sheet provided by this invention comprises a substrate whose primary component is a resin film and a PSA layer placed on one face of the substrate. The PSA sheet comprises a protection sheet part which is adhered to an adherend to protect it, a marginal part bounded from the protection sheet part by a tear-off line surrounding the protection sheet part, and a tear-aiding structure provided along the tear-off line. The PSA sheet is configured so that after the protection sheet part is adhered to the adherend, when the marginal part is pulled in a direction in which the PSA sheet is peeled off the adherend, the marginal part is torn off the protection sheet part.

16 Claims, 3 Drawing Sheets

(51) Int. Cl.
  *C09J 7/40* (2018.01)
  *C09J 7/24* (2018.01)
  *C09J 123/08* (2006.01)
  *C09J 123/12* (2006.01)
  *C09J 5/00* (2006.01)
  *B32B 38/10* (2006.01)
  *B32B 37/12* (2006.01)

(52) U.S. Cl.
  CPC ....... *C09J 123/0853* (2013.01); *C09J 123/12* (2013.01); *B32B 37/12* (2013.01); *B32B 38/10* (2013.01); *C08G 2170/40* (2013.01); *C09J 5/00* (2013.01)

(58) Field of Classification Search
  CPC ... C09J 123/12; C09J 5/00; C09J 7/241; C09J 7/38; C09J 7/40
  See application file for complete search history.

(56) References Cited

U.S. PATENT DOCUMENTS

| | | | | |
|---|---|---|---|---|
| 5,106,123 | A * | 4/1992 | Shieh | B65H 19/29 206/390 |
| 5,172,936 | A | 12/1992 | Sullivan | |
| 2002/0197434 | A1 | 12/2002 | Rosenbaum | |
| 2011/0061802 | A1 | 3/2011 | Raming | |
| 2015/0010700 | A1 | 1/2015 | Bartusiak | |
| 2018/0022965 | A1* | 1/2018 | Igarashi | C09J 7/38 428/343 |
| 2019/0249041 | A1* | 8/2019 | Igarashi | C09J 7/241 |

FOREIGN PATENT DOCUMENTS

| | | | | |
|---|---|---|---|---|
| JP | 2-85137 | U | | 7/1990 |
| JP | 10-291376 | A | | 11/1998 |
| JP | 2001-143043 | A | | 5/2001 |
| JP | 2001-277757 | A | | 10/2001 |
| JP | 3101717 | U | | 6/2004 |
| JP | 2007-50622 | A | | 3/2007 |
| JP | 2008-115259 | A | | 5/2008 |
| JP | 2010-58975 | A | | 3/2010 |
| JP | 2010121044 | A | * | 6/2010 |
| JP | 2010-150389 | A | | 7/2010 |
| JP | 5203593 | B2 | * | 6/2013 |
| JP | 5203593 | B2 | | 6/2013 |
| JP | 3185524 | U | | 8/2013 |
| WO | WO-9534421 | A1 | * | 12/1995 ............. B31D 1/021 |
| WO | WO-2007001078 | A1 | * | 1/2007 ............. B23K 26/18 |

OTHER PUBLICATIONS

English translation of EP1386941.*
English translation of JP2010121044.*
English translation of EP4105291.*
Notice of Reasons for Refusal dated Apr. 8, 2021 issued by the Japanese Patent Office in Japanese Application No. 2017-134481.
Notice of Reasons for Refusal dated Nov. 18, 2021 from the Japanese Patent Office in JP Application No. 2017-134481.
Notification of First Office Action dated Dec. 2, 2020 from the Chinese Patent Office in Chinese Application No. 201710590506.6.
Decision to Grant Patent dated Jun. 2, 2022 issued by the Japanese Patent Office in Japanese Application No. 2017-134481.

* cited by examiner

[Fig. 1]
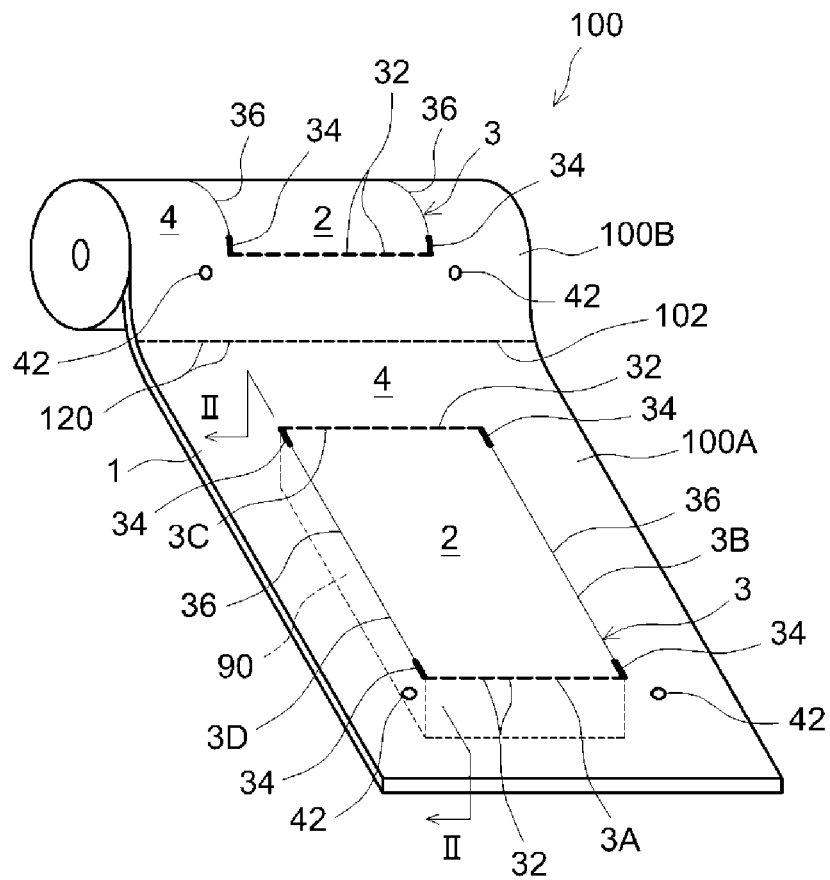
[Fig. 2]
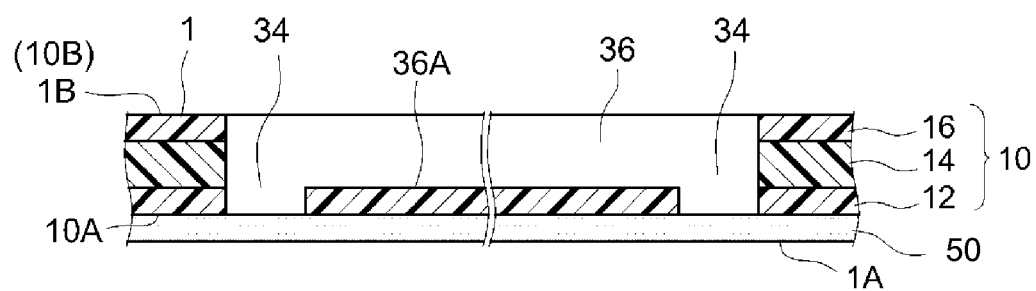

[Fig. 3]
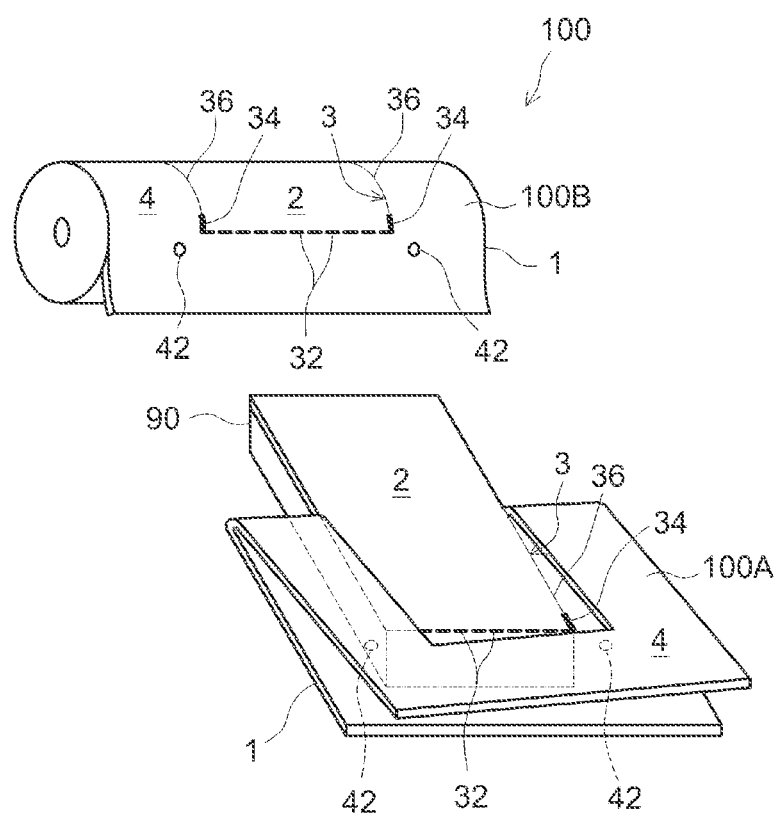

PRESSURE-SENSITIVE ADHESIVE SHEET

CROSS-REFERENCE

This application is a divisional application of U.S. application Ser. No. 15/649,708 filed on Jul. 14, 2017, which claims priority to Japanese Patent Application No. 2016-142776 filed on Jul. 20, 2016, the entire content of each of which is incorporated herein by reference.

BACKGROUND OF THE INVENTION

Field of the Invention

The present invention relates to a pressure-sensitive adhesive sheet, in particular, a pressure-sensitive adhesive sheet comprising a protection sheet part which is to be applied to an adhered to protect it.

Description of the Related Art

For surfaces of metal plates, painted steel plates, synthetic resin plates, etc., to prevent damage such as scratches and dirt deposits, it is known to apply protection sheets thereto for protection. Such a protection sheet generally has a pressure-sensitive adhesive (PSA) on a first face of a substrate sheet formed from resin film, etc. Via the PSA, the protection sheet is adhered to an adherend (an object to be protected) to cover the adherend surface so that it can achieve the protection purpose. Technical documents related to protection sheets include Japanese Patent No. 5203593 and Japanese Patent Application Publication No. 2007-50622.

SUMMARY OF THE INVENTION

It is generally desirable that a protection sheet has a shape suited to the protected region in an object to be protected. In this aspect, Japanese Patent No. 5203593 discloses an applicator sheet that comprises an adhesive sheet formed inside a row of cut holes as well as an unneeded part surrounding the adhesive sheet; and by pulling the unneeded part in the width direction, the adhesive sheet and the unneeded part can be separated. However, in the art according to Japanese Patent No. 5203593, the shape precision of the separated adhesive sheets tends to be either low or inconsistent. Japanese Patent Application Publication No. 2007-50622 discloses a vehicle-protecting laminate film provided with a tear-off perforation along the boundary between a vehicle-covering part and an anti-deformation part extending from one edge of the vehicle-covering part. However, since the vehicle-protecting laminate film is pre-cut, customized to the shape of a designated part, its periphery is likely to collect dust, etc. As another problem, while being applied to an adherend, the adhesive face of the vehicle-covering part is likely to be directly touched and contaminated by fingers of a worker.

The present invention has been made in view of such circumstances with an objective to provide a PSA sheet that allows for an efficient installation of a protection sheet with excellent shape precision on the surface of an object to be protected.

The present description provides a PSA sheet comprising a substrate and a PSA layer placed on one side of the substrate. The PSA sheet comprises a protection sheet part to be adhered to an adherend to protect it, a marginal part bounded from the protection sheet part by a tear-off line surrounding the protection sheet part. The PSA sheet comprises a tear-aiding structure, or a tear-aiding structural feature, provided along the tear-off line. The substrate comprises a resin film as the primary component. The PSA sheet is configured so that after the protection sheet part is adhered to an adherend, when the marginal part is pulled in a direction (a peel direction) in which the PSA sheet is peeled off the adherend, the marginal part is torn off the protection sheet part.

In the PSA sheet in this embodiment, the protection sheet part is a region that is used to protect the adherend and forms a separate protection sheet when the marginal part is torn off. With the PSA sheet, the operation as easy as applying the protection sheet part to an adherend followed by pulling the marginal part (the area surrounding the protection sheet part) in a direction in which the PSA sheet is peeled off the adherend, the marginal part can be torn off with high precision. Thus, it makes it possible to efficiently realize a situation that an adherend surface to which a protection sheet with excellent shape precision is adhered. Because the marginal part is provided surrounding the protection sheet part, a worker can make placement adjustments (positioning) or redo the application, if necessary, by holding the marginal part of the PSA sheet. Thus, incidents of directly touching the adhesive face of the protection sheet part with the worker's finger, etc., can be avoided to prevent degradation of the protective function caused by contamination of the adhesive face. The protection sheet part surrounded by the marginal part is also preferable from the standpoint of preventing accumulation of dust and the like on the periphery of the protection sheet part of the PSA sheet before used.

In a preferable embodiment of the PSA sheet, the surface (adhesive face) of the PSA layer may be separably in contact with the back face (the face on the reverse side of the adhesive face, typically the second face of the substrate) of the PSA sheet, whereby the adhesive face is protected. In such an embodiment, the PSA sheet can be free of a separate release liner. The PSA sheet in such an embodiment can be advantageous in terms of workability because its application to an adherend requires no release liner separation or removal; it is also preferable from the standpoint of reducing wastes.

Specific examples of the embodiment where the adhesive face is separably (releasably) in contact with the back face of the PSA sheet include a laminate form where two or more PSA sheets are layered with the adhesive face of one PSA sheet placed in contact with the back face of another PSA sheet, and a roll form where a long PSA sheet is wound in a roll with its adhesive face in contact with its back face.

The PSA sheet according to a preferable embodiment is long and wound in a roll, comprising a plurality of protection sheet parts serially arranged in the length direction of the PSA sheet. With respect to the PSA sheet in such an embodiment, protection sheets can be installed on two or more adherends efficiently and precisely by repeating the procedure including the followings; a required length is dispensed from the roll form, the protection sheet part is adhered to an adherend, and the marginal part is torn off.

The PSA sheet disclosed herein preferably comprises at least a cut hole or a groove as the tear-aiding structure. By this, the marginal part can be easily and precisely torn off the protection sheet part.

In a preferable embodiment, the tear-aiding structure comprises at least a groove running along the tear-off line. With such a groove, when the protection sheet is applied to an adherend and the PSA sheet is pulled in the peel direction, the PSA sheet tends to be precisely torn off in the thickness direction along the groove to form a protection sheet with a smooth periphery.

In an embodiment where the tear-aiding structure includes a groove, the resin material forming the groove bottom in the substrate preferably exhibits a tensile modulus of 300 MPa or greater. By this, the PSA sheet can be sharply torn off along the groove, and the shape precision and the appearance quality of the protection sheet tends to improve.

In an embodiment of the PSA sheet disclosed herein, as the substrate, a substrate comprising a polyolefinic resin film can be preferably used. This tends to increase the curved surface conformability of the PSA sheet.

In the PSA sheet disclosed herein, the protection sheet part preferably exhibits a 180° peel strength of 3 N/25 mm or greater. When the peel strength is at or above the prescribed value, the operation of applying the protection sheet part to an adherend and pulling the marginal part in the peel direction to tear it off can be stably carried out. This can increase the ease of tearing off the marginal part and the precision of tearing.

The PSA sheet disclosed herein may comprise a plurality of application units divided by separation lines. Here, each application unit comprises at least one each of the protection sheet part and the marginal part surrounding the protection sheet part. When the PSA sheet in such an embodiment is used, by carrying out application to adherends and tearing unit by unit, protection sheets can be installed on the adherends efficiently and precisely.

When the PSA sheet is long and wound in a roll, a plurality of application units can be serially arranged in the length direction of the PSA sheet, divided by separation lines running across the width of the PSA sheet. With respect to the PSA sheet in such an embodiment, for instance, a length corresponding to one application unit is dispensed from the roll form; after or before the protection sheet part is applied to an adherend, the application unit is torn off along the separation line to separate it from the next application unit; the marginal part is torn off the protection sheet part; the preceding procedure is repeated to efficiently and precisely install protection sheets on a plurality of adherends.

The PSA sheet disclosed herein can be provided with a positioning assistant to assist positioning of the PSA sheet. By this, an adherend and a protection sheet part can be efficiently aligned to facilitate the work. In a preferable embodiment, the positioning assistant can be provided to the marginal part of the PSA sheet. The positioning assistant thus provided to the marginal part can facilitate the positioning work while minimizing influences on the performance of the protection sheet part.

The present description provides a method for producing a protection sheet-bearing member in which a protection sheet is adhered to the surface of the member. The production method includes obtaining a PSA sheet that comprises a substrate whose primary component is a resin film and a PSA layer placed on a first face of the substrate. The PSA sheet comprises a protection sheet part to be adhered to an adherend to protect it, a marginal part bounded from the protection sheet part by a tear-off line surrounding the protection sheet part, and a tear-aiding structure provided along the tear-off line. The production method also includes adhering the protection sheet part to the member, and pulling the marginal part in a direction in which the PSA sheet is peeled off the member, thereby tearing the marginal part off the protection sheet part and leaving the protection sheet part on the member. According to such a production method, a protection sheet formed of the protection sheet part can be precisely and efficiently applied to the surface of a member. Thus, high-quality protection sheet-bearing members can be produced efficiently.

This description provides a method for applying a protection sheet to the surface of a member. The application method includes obtaining a PSA sheet that comprises a substrate whose primary component is a resin film and a PSA layer placed on a first face of the substrate. The PSA sheet comprises a protection sheet part to be adhered to an adherend to protect it, a marginal part bounded from the protection sheet part by a tear-off line surrounding the protection sheet part, and a tear-aiding structure provided along the tear-off line. The application method also includes adhering the protection sheet part to the member, and pulling the marginal part in a direction in which the PSA sheet is peeled off the member, thereby tearing the marginal part off the protection sheet part and leaving the protection sheet part on the member. According to such an application method, a protection sheet formed of the protection sheet part can be precisely and efficiently applied to the surface of a member.

BRIEF DESCRIPTION OF THE DRAWINGS

FIG. 1 is a diagram illustrating an example of how the PSA sheet according to an embodiment can be used.

FIG. 2 is a cross-sectional diagram at line II-II in FIG. 1.

FIG. 3 is a diagram illustrating an example of how the PSA sheet according to an embodiment can be used.

FIG. 4A illustrates machining pattern 1, FIG. 4B illustrates machining pattern 2, FIG. 4C illustrates machining pattern 3, FIG. 4D illustrates machining pattern 4, FIG. 4E illustrates machining pattern 5, FIG. 4F illustrates machining pattern 6, FIG. 4G illustrates machining pattern 7, and FIG. 4H illustrates machining pattern 8.

DETAILED DESCRIPTION OF THE INVENTION

Figure 4A:
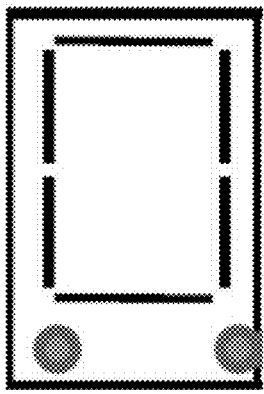
FIGS. 4A to 4H illustrates machining patterns.
Figure 4B:
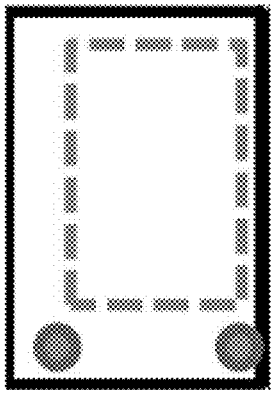
Figure 4C:
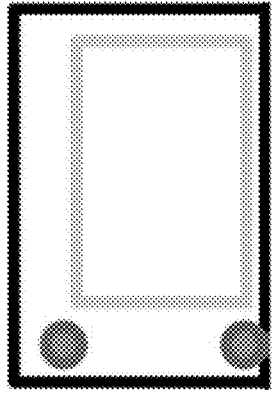
Figure 4D:
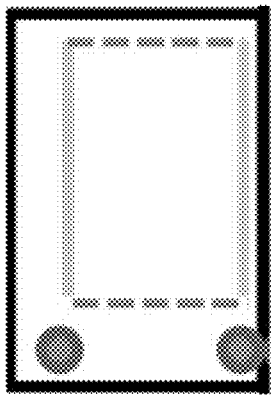
Figure 4E:
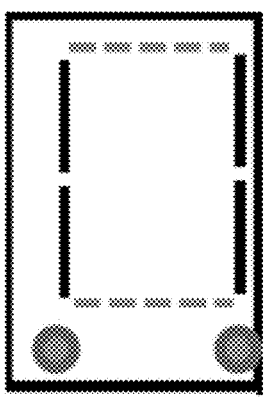
Figure 4F:
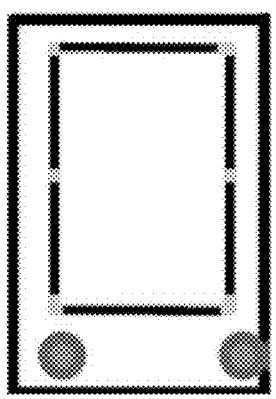
Figure 4G:
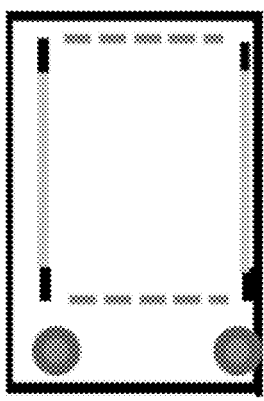
Figure 4H:
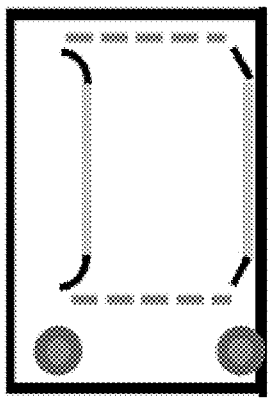

Preferred embodiments of the present invention are described below. Matters necessary to practice this invention other than those specifically referred to in this description may be understood to a person ordinarily skill in the art based on the disclosures about embodiments of the invention according to the present description and common technical knowledge at time the application was filed. The present invention can be implemented based on the contents disclosed herein and common technical knowledge in the subject field. In the drawings referenced below, a common reference numeral may be assigned to members or sites producing the same effects, and redundant descriptions may be omitted or simplified. The embodiments in the drawings are schematically illustrated for clearly describing the present invention, and do not necessarily represent the dimensions or scales of an actual product.

An embodiment of the PSA sheet disclosed herein is described with reference to drawings.

A PSA sheet 1 shown in FIG. 1 comprises a protection sheet part 2 to be applied to an adherend 90 which is an object subject to protection, and a marginal part 4 bounded from the protection sheet part 2 by a tear-off line 3 surrounding the protection sheet part 2. Protection sheet part 2 has a shape corresponding to the protected region in adherend 90. In the example shown in FIG. 1, protection sheet part 2 has an identical rectangular shape as the top face of adherend 90 having a rectangular board shape. PSA sheet 1 is configured so that by tearing the marginal part 4 off (apart from) the protection sheet part 2 along the tear-off line 3, a separate protection sheet is formed with a peripheral shape corresponding to the protected region. As used herein, that the tear-off line surrounds the protection sheet part means that 50% or more (typically 60% or more, e.g. 75% or more) in length of the circumference of the protection sheet formed from the protection sheet part is adjacent to the marginal part, bounded by the tear-off line. Thus, the PSA sheet disclosed herein is not limited to an embodiment such as the PSA sheet 1 in FIG. 1 where the entire circumference of protection sheet part 2 is surrounded by the tear-off line 3. For instance, it can also be in an embodiment where a rectangular protection sheet part is surrounded on three sides by a marginal part, along with a tear-off line, with the remaining one side forming an outer edge of the PSA sheet. Alternatively, the remaining one side may be designated as a separation line that divides application units described later. That is, part of the tear-off line may also serve as the separation line. In a preferable embodiment, the protection sheet part is surrounded on the entire circumference by the tear-off line.

PSA sheet 1 comprises a substrate 10 and a PSA layer 50 placed on a first face 10A thereof. Substrate 10 has a release face on a second face (back face) 10B of substrate 10. Substrate 10 comprises a monolayer or multilayer (i.e. two-layer or higher; the same applies hereafter) resin film as the primary component. As the multilayer resin film, as shown in FIG. 2, a three-layer resin film can be preferably used, the three-layer resin film having a front layer 12 forming the first face 10A of substrate 10, a back layer 16 forming the back face 10B of the substrate, and a middle layer 14 placed between them. Although the PSA layer 50 is typically formed in a continuous manner, it may be formed in a random or regular pattern of dots, stripes, etc., depending on the purpose and application. The PSA layer 50 can be provided at least partially to the protection sheet part 2 (typically at least to an annular part along the circumference of the protection sheet part 2); the marginal part 4 may be partially or entirely free of the PSA layer 50. In an embodiment preferable from the standpoint of the productivity of PSA sheets 1, the PSA layer 50 is provided to the entire area of the first face 10A of substrate 10. In another preferable embodiment, the PSA layer 50 is provided to the entire area of the protection sheet part 2 in the first face 10A of substrate 10 and to areas of the marginal part 4 adjacent to the protection sheet part 2, but not to a border area of the marginal part 4 along one or each edge of the length direction (one or each widthwise edge) of substrate 10.

The PSA sheet 1 includes a tear-aiding structure provided along the tear-off line 3, that is, on the line in accordance with the tear-off line 3. By this, with the protection sheet part 2 adhered to an adherend, the marginal part 4 of the PSA sheet 1 is pulled in the peel direction, the PSA sheet 1 undergoes tearing in the thickness direction along the tear-off line 3 and the marginal part 4 is torn off the protection sheet part 2, whereby the remaining protection sheet part 2 forms a protection sheet on the adherend. In the example shown in FIG. 1, the tear-aiding structure comprises perforations 32, slits 34 and grooves 36 in combination. Here, perforations 32 and slits 34 are through holes (cut holes) in substrate 10. Grooves 36 are depressions formed to certain depths, but not all through substrate 10 and can be provided to the first face 10A side of substrate 10, to the second face (back face) 10B side, or to each side. In the example shown in FIG. 1, grooves 36 are incised marks formed by allowing a machine blade to penetrate substrate 10 to a depth equivalent to about three-fourth the thickness on the second face 10B side of substrate 10. They can be thought as narrow V-shaped grooves.

In the example shown in FIG. 1, perforations 32, slits 34 and grooves 36 forming the tear-aiding structure 30 are arranged in particular as follows: On the rectangular tear-off line 3, perforations 32 are formed over the entire lengths of short sides 3A and 3C. For each of long sides 3B and 3D, slits 34 are formed at both ends and a groove 36 is formed to connect the slits 34. By this, as shown in FIG. 2, in the cross section taken along the long side 3B in the tear-off line 3, at both ends of long side 3B, slits 34 as through holes in substrate 10 are provided between the protection sheet part 2 and the marginal part 4. Between the slits 34, the protection sheet part 2 and the marginal part 4 are connected at the bottom 36A of the groove 36. The cross section taken along the long side 3D also has the same structure. The protection sheet part 2 and the marginal part 4 of the PSA sheet 1 are connected at the bottom 36A of groove 36 and also between cut holes forming perforations 32 arranged at short sides 3A and 3C.

The PSA sheet 1 shown in FIG. 1 is long and wound in a roll with the surface (adhesive face) 1A of the PSA layer 50 separably in contact with the back face 10B of substrate 10, which is also the back face 1B of the PSA sheet 1 in this embodiment, to form a PSA sheet roll 100. That is, PSA sheet roll 100 is free of a release liner, apart from the PSA sheet 1. With respect to such a release liner-free PSA sheet roll 100, when the PSA sheet 1 is dispensed from the PSA sheet roll 100, the adhesive face 1A is exposed upon separation from the back face 10B of the substrate. Thus, apart from dispensing the PSA sheet 1, it is unnecessary to remove any release liner to expose the adhesive face 1A, whereby application of the PSA sheet 1 is facilitated. The PSA sheet roll 100 free of a release liner is preferable also from the standpoint of making the PSA sheet roll 100 lighter in weight to reduce the load on a worker and of making the PSA sheet 1 longer to reduce the frequency of changing PSA sheet rolls 100. It is also preferable in view of saving resources.

The PSA sheet 1 forming the PSA sheet roll 100 comprises two or more application units arranged serially in the length direction of the PSA sheet 1. FIG. 1 shows two application units 100A and 100B of the PSA sheet 1 from the outer end of the roll. A protection sheet part 2 and a marginal part 4 described earlier are formed in each application unit. According to the PSA sheet 1 in such an embodiment, by applying protection sheet parts 2 and tearing off marginal parts 4 unit by unit, protection sheets formed with protection sheet parts 2 can be installed on the surfaces of adherends 90 efficiently and precisely. FIG. 1 shows an example of an embodiment where one application unit has one protection sheet part, but it is not limited to this. It can be in an embodiment where one application unit includes two or more protection sheet parts.

Between the respective application units, separation lines 102 are marked across the width of the PSA sheet 1. Cutting the PSA sheet 1 along the separation lines 102 at appropriate timings may facilitate unit-by-unit application of protection sheet parts 2 and tearing of marginal parts 4. The PSA sheet 1 is preferably provided with a separation-aiding structure 120 along a separation line 102. With the separation-aiding structure 120, each application unit can be torn off along the separation line 102 without the use of a cutting device such as a cutter. The separation-aiding structure 120 can be formed of, for instance, a perforation, a slit, a groove, or a combination of these, similarly to the tear-aiding structure 30. In the example shown in FIG. 1, a separation-aiding structure 120 is constituted with a perforation formed over the entire length of the separation line 102. Alternatively, in some embodiments, application units can be separated using a suitable cutting device in absence of such a separation-aiding structure.

In each of marginal parts 4 of application units 100A and 100B, there is formed a positioning assistant 42 useful when placing the protection sheet part 2 on an adherend 90. In the example shown in FIG. 1, the positioning assistant 42 is an approximately circular through hole. For instance, alignment of the protection sheet part 2 and adherend 90 can be facilitated by allowing a columnar alignment guide (not shown in the drawing) provided to a designated location on the adherend 90 to pass through the through hole. In the example shown in FIG. 1, a total of two through holes per one application unit are provided as positioning assistants. These two though holes are arranged in the marginal part 4 on the fore edge side (closer to the outer end of the roll) relative to the protection sheet part 2, near the two lengthwise edges of the PSA sheet 1 (one through hole at each edge). The arrangement or the number of positioning assistants 42 is not, however, limited to this.

The PSA sheet 1 in such an embodiment can be favorably used, for instance, in the following manner: As shown in FIG. 1, one application unit is dispensed from the PSA sheet roll 100 and the application unit 100A at the fore end of the PSA sheet 1 is spread over an adherend 90 with some space left between itself and the top face (the protected face) of the adherend 90. The adherend 90 can be an automobile constituent member (e.g. an exterior plate or a pillar of a vehicle). The positioning assistants 42 of application unit 100A are set on alignment guides not shown in the drawing to align the adherend (member) 90 and the protection sheet part 2. Here, as necessary, the placement can be corrected or finely adjusted by holding the marginal part 4. The protection sheet part 2 is then adhered to the adherend 90. Although no particular limitations are imposed, the adhesion procedure can be carried out so that, for instance, press-bonding the protection sheet part 2 onto the adherend 90 proceeds from the fore end (in FIG. 1, from the end of the PSA sheet 1 closer to the viewer) towards the rear end of the protection sheet part 2. The protection sheet part can be press-bonded, using an applicator such as a squeegee as necessary.

After the protection sheet part 2 is adhered to the adherend 90, the PSA sheet 1 is cut along the separation line 102 dividing the application units 100A and 100B. The application unit 100A is thereby torn off the rest of the PSA sheet 1. As shown in FIG. 3, when the marginal part 4 is pulled in a direction in which the PSA sheet 1 (the application unit 100A here) is peeled off the adherend 90, by the adhesive strength of the protection sheet part 2 to the adherend 90 and the tear-aiding structure 30, the marginal part 4 is torn off along the tear-off line 3, leaving the protection sheet part 2 on the adherend 90. The remaining protection sheet part 2 forms the protection sheet to protect the adherend 90. The adherend 90 bearing the protection sheet on the surface (a protection sheet-bearing member) can be thus obtained.

Subsequently, a new adherend 90 is set up; the next one application unit is dispensed from the PSA sheet roll 100; using the application unit 100B at the fore end of the PSA sheet 1, a protection sheet is placed on the surface of the adherend 90, in a similar manner as with the application unit 100A. By repeating this, using the PSA sheet roll 100, protection sheets can be efficiently installed on a plurality of adherends 90.

For pulling the marginal part 4 in a direction in which the PSA sheet 1 is peeled off the adherend 90, typically in a direction at a right angle to the surface of the adherend 90, the pulling angle (the angle between the pulling direction and the surface of the adherend 90) is not particularly limited as long as it enables tearing of the marginal part 4, leaving the protection sheet part 2 on the adherend 90. The pulling angle can be, for instance, 30° or larger (preferably 45° or larger) to the surface of the adherend 90. From the standpoint of inhibiting lifting of the protection sheet part 2 caused by the pulling, the pulling angle is usually suitably 60° or larger. From the standpoint of increasing the tearing precision by efficiently tearing the PSA sheet 1 along the tear-off line 3 (typically by tearing the PSA sheet 1 in the thickness direction), the pulling angle is preferably 90° or larger (e.g. larger than 90°), or it can be 105° or larger, or even 120° or larger (e.g. 135° or larger). The maximum pulling angle is not particularly limited. From the standpoint of the workability, it is usually suitably smaller than 180° (e.g. 160° or smaller).

Although no particular limitations are imposed, it is preferable that the marginal part 4 is pulled in a direction generally miming along the length direction (e.g. in a direction at an angle of up to 30° to the length direction, preferably up to 15°, e.g. up to 10°). This tends to increase the tearing precision. When the length direction of the PSA sheet 1 generally coincides with the length direction of the PSA sheet part 2 as shown in FIG. 1, the marginal part 4 can be torn off, starting from the fore end side of the PSA sheet 1 (in FIG. 1, from the viewer's side) or from the rear end side. From the standpoint of the workability, as in the example shown in FIG. 3, in a preferable embodiment, the PSA sheet 1 is cut off at the rear end of the application unit 100A along the separation line 102 shown in FIG. 1, and subsequently, the rear end of the marginal part 4 is pulled towards the fore end to start tearing off the marginal part 4 starting from the rear end side.

In the example described above, after the protection sheet part 2 is adhered to the adherend 90, the application unit 100A is torn off the rest of the PSA sheet 1 (i.e. the application unit 100B and the following portion). However, the application unit 100A can be adhered to the adherend 90 after the application unit 100A is torn off the PSA sheet 1. From the standpoint of the ease of handling (e.g. the ease of application) of the PSA sheet 1, when the application unit 100A is, for instance, 15 cm or longer (especially 30 cm or longer), it is preferable to select an embodiment where the application unit 100A is torn off the PSA sheet 1 after the protection sheet part 2 is adhered to the adherend 90. According to such an embodiment, because the rear end of the application unit 100A is connected to the rest of the PSA sheet 1, by holding the application unit 100A with a tension force applied across the PSA sheet roll 100 and the application unit 100A (more specifically, e.g. a positioning assistant 42), wrinkling and twisting of the protection sheet part 2 can be prevented. In view of preventing contamination of the protection sheet part 2, it is also preferable to apply the protection sheet part 2 to the adherend 90 before cutting the application unit 100A off the rest of the PSA sheet 1.

In the embodiment shown in FIG. 1, the tear-aiding structure 30 is provided only on the tear-off line 3, but not to the inside or outside of the tear-off line 3. Thus, the PSA sheet 1 is free of cut holes such as a perforation or slits inside the tear-off line, that is, in the range of the protection sheet part 2. In such an embodiment, the protection sheet formed from the protection sheet part 2 can provides good protection. In absence of a tear-aiding structure placed off to the inside or outside of the tear-off line, the marginal part 4 can be torn off along the tear-off line 3 with excellent shape precision.

<Tear-Aiding Structure>

The PSA sheet disclosed herein is provided with a tear-aiding structure along a tear-off line that bounds a protection sheet part and a marginal part, whereby the marginal part can be precisely torn off the protection sheet part. The PSA sheet is configured so that the marginal part can be torn off without using a cutting device such as a cutter. The tear-aiding structure is not particularly limited as long as its form is useful in such a tearing process. In other words, the tear-aiding structure in the art disclosed herein is not limited to the example shown in FIG. 1. Any form is allowed as long as it is useful in facilitating the operation of tearing off the marginal part along the tear-off line or in increasing the precision of the operation. Favorable examples of the tear-aiding structure include cut holes and grooves. The tear-aiding structure in the art disclosed herein may comprise one, two or more types of cut holes; one, two or more types of grooves; or a combination of these.

(Cut Holes)

As used herein, the cut hole(s) forming the tear-aiding structure refer to line cut(s) or eyelet(s) made through the substrate and the concept encompasses a perforation and a slit. The cut hole(s) may be formed before or after the PSA layer is placed on the substrate. From the standpoint of the ease of application of a PSA composition, etc., in an embodiment, the cut hole(s) are preferably formed after the PSA layer is formed. In this case, the cut hole(s) may go through the substrate and also the PSA layer or may go through the substrate and reach halfway through the thickness of the PSA layer. Alternatively, the cut hole(s) may go through the substrate, but stops at the PSA layer.

The perforation refers to a row of cut holes arranged at certain intervals (with uncut sections) on the tear-off line, with each cut hole having a length A and each uncut section having a length B at an A:B ratio in a range of 0.3:1 to 5:1. Here, the lengths A and B refer to the lengths along the tear-off line. The number of cut holes forming a perforation can typically be at least 3, for instance, at least 5. The maximum number the cut holes is not particularly limited. The length A of each cut hole forming the perforation is usually suitably 0.1 mm or greater, or preferably 0.3 mm or greater, more preferably 0.5 mm or greater, e.g. 1 mm or greater. From the standpoint of enhancing the handling properties of the PSA sheet 1, for instance, inhibiting loosening and sagging of the PSA sheet in areas adjacent to cut holes, or even increasing the ease of application, the upper limit of the length A is usually suitably 20 cm or less, preferably 15 cm or less, or more preferably 12 cm or less (e.g. 10 cm or less). In an embodiment, the length A of each cut hole forming the perforation can be less than 10 mm, 7 mm or less, or even 5 mm or less.

The slit is a cut hole not included in the perforation and refers to, for instance, a cut hole that has a length A at a ratio (A:B) to the length B of its adjacent uncut section of greater than 5:1 (e.g. 7:1, 10:1, 100:1, etc.). In view of the tear-aiding effects, the length A of each slit is usually suitably 2 mm or greater, or preferably 5 mm or greater (e.g. 7 mm or greater). From the standpoint of the handling properties (e.g. the ease of application) of the PSA sheet 1, the upper limit of the length A is usually suitably 20 cm or less, preferably 15 cm or less, or more preferably 12 cm or less (e.g. 10 cm or less).

The uncut section, present possibly between cut holes forming the perforation or adjacent to a slit, can be a non-processed segment of the tear-off line where the tear-aiding structure 30 is absent or a segment where a groove (e.g. an incised mark) is formed as described later. From the standpoint of enhancing the handling properties of the PSA sheet (e.g. inhibiting accidental tearing of the uncut section before purposeful tearing of the marginal part), the length of the uncut section is usually suitably about 0.3 mm or greater, or preferably 0.5 mm or greater (e.g. 0.7 mm or greater). When the uncut section is a non-processed segment, from the standpoint of the tearing precision, the length of the uncut section is usually suitably 15 mm or less, or preferably 10 mm or less; or it can be 7 mm or less, or even 5 mm or less (e.g. 3 mm or less). The tear-off line in the art disclosed herein is preferably free of a non-processed segment longer than 15 mm over its entire length (i.e. the entire length of the border line between the protection sheet part and the marginal part). On the other hand, when a groove (e.g. an incised mark) is formed in the uncut section, the maximum length of the uncut section is not particularly limited.

The method for forming the cut hole(s) is not particularly limited. For instance, a method using a known perforating machine or slitting machine can be employed. The process of forming the cut hole(s) can be done on the first side of the substrate or on the second side (the back side). When the cut hole(s) are formed after the PSA layer is placed on the substrate, from the standpoint of preventing PSA accumulation on the machine blade, a method where the substrate is processed from the back side of the substrate can be preferably employed.

(Grooves)

As used herein, the groove(s) forming the tear-aiding structure refer to depression(s) in, but not through the substrate. The groove(s) can be thought as places where the thickness of the substrate is partially smaller as compared to the surroundings (typically the both sides of the tear-off line). With these grooves formed on the tear-off line, tearing of the PSA sheet proceeds along the grooves, preventing the tearing from taking place off the designated tear-off line (i.e. preventing the tearing from proceeding in an unexpected direction), whereby a protection sheet can be formed with a precise shape. In addition, the PSA sheet can be smoothly split along the grooves; and therefore, the appearance of the edges in the resulting protection sheet tends to be improved. For instance, fraying and splintering possibly caused during the tearing process by partial stretching of the resin film forming the substrate can be effectively reduced.

Here, the concept of groove encompasses a practically widthless form such as an incised mark formed by allowing a machine blade to penetrate a substrate from the first face thereof to a certain depth, but not all through the substrate followed by removing the machine blade. Examples of other forms of the groove include a depression formed by scoring or imprinting (pressing). The incised mark can be preferably used because it is highly effective in facilitating precise tearing of the substrate along the tear-off line. The groove (e.g. an incised mark) can be formed before or after the PSA layer is placed on the substrate. From the standpoint of the ease of applying the PSA composition, etc., in an embodiment, the groove can be preferably formed after the PSA layer is formed.

The groove depth relative to the thickness of the substrate can be selected to obtain suitable tear-aiding effects, and is not particularly limited. In an embodiment, the groove depth can be, for instance, 5% or more of the thickness of the substrate. From the standpoint of obtaining greater tear-aiding effects, it can be preferably 20% or more, more preferably 40% or more, e.g. 60% or more. From the standpoint of the handling properties of the PSA sheet, the groove depth is usually suitably 95% or less (preferably 85% or less, e.g. 80% or less) of the thickness of the substrate. The groove can be formed so that the thickness of the substrate at the groove bottom (i.e. the thickness from the groove bottom to the surface on the reverse side of the substrate) is, for instance, 2 μm or greater. From the standpoint of the handling properties of the PSA sheet, the thickness of the substrate at the groove bottom is usually suitably 5 μm or greater (e.g. 7 μm or greater). The maximum thickness of the substrate at the groove bottom is not particularly limited. It can be, for instance, 30 μm or less, or even 20 μm or less.

The groove length is not particularly limited. For instance, when the groove length is 5 mm or greater (preferably 7 mm or greater, e.g. 10 mm or greater), the effects of the groove can be obtained to a greater extent. In an embodiment, the groove length can be 50 mm or greater, or even 100 mm or greater.

The method for forming the groove is not particularly limited. For instance, it is possible to employ a method using a known incision device, scoring device, pressing device, etc. When the groove is formed by pressing, it can be formed on one side of the substrate, on the other side (on the back side), or at corresponding locations on each side of the substrate. When an incised mark or a scored groove is formed, especially when the groove is formed after the PSA layer is formed, from the standpoint of the tear-aiding effects and the ease of processing, the groove is preferably formed on the back side of the substrate.

(Design of Tear-Aiding Structure)

Although no particular limitations are imposed, several preferable examples of designs (machining patterns) of the tear-aiding structure are described.

As the tear-aiding structure, the PSA sheet disclosed herein preferably has a cut hole at least partially at the tearing start edge (the edge where tearing of the marginal part starts). The tearing start edge can typically be one of the edges of the length direction of the protection sheet part. The cut hole(s) can be a perforation or a slit. The tearing start edge may be provided with both a perforation and a slit. With this feature, tearing of the marginal part proceeds smoothly and the protection sheet is prevented from lifting off the adherend. The tearing start point prescribed by the pre-formed cut hole(s) can help start accurate tearing along the tear-off line. Thus, upon tearing of the marginal part, a protection sheet with a precise outer shape can be formed. A favorable example of the tear-aiding structure includes a perforation or a slit provided over almost the entire width (e.g. 75% or more of the width, preferably 85% or more) of the tearing start edge.

In a preferable embodiment, the tear-aiding structure can include a groove formed at least partially over a segment running from the tearing start edge to the tearing finish edge of the marginal part, that is, the length of a lateral side of the tear-off line. With such a structural feature, even when the speed of tearing the lateral side (the speed of pulling the marginal part) is increased, the resulting protection sheet tends to have a highly precise shape and a good appearance. This is advantageous in view of increasing the efficiency of applying protection sheets. The groove may be provided to the entire length of the lateral side or only to a partial length of the lateral side, combined with, for instance, a perforation or a slit. In view of possibly decreasing the number of uncut sections, a slit is more advantageous than a perforation as the cut hole(s) formed at the lateral side. When a perforation and/or a slit are formed at the lateral side, grooves provided to the uncut sections can improve the appearance of cut edges, whereby the resulting protection sheet may have a highly precise shape. Although no particular limitations are imposed, in an embodiment, the tear-aiding structure can be generally the same between the two lateral sides. This allows tearing of the marginal part to proceed generally in the same manner at the two lateral sides, thereby increasing the workability.

In a preferable embodiment, for instance, as in Pattern 7 in Examples described later, the tear-aiding structure may include a cut hole (typically a slit) positioned continuously or adjacently to the tearing start edge of the marginal part which is an edge of a lateral side of the tear-off line, and a groove (typically an incised mark) formed continuously or adjacently to the tearing finish edge of the cut hole. According to the PSA sheet in such an embodiment, the cut hole at the tearing start edge of a lateral side effectively dictates the direction in which tearing of the PSA sheet proceeds on the lateral side; and tearing of the PSA sheet on the lateral side is then allowed to proceed along the groove placed continuously or adjacently to the tearing finish end of the cut hole; whereby a protection sheet with a highly precise shape and a good appearance can be obtained more certainly and efficiently. Herein, that the cut hole is adjacent to an edge on the tearing start edge side may typically mean that the distance from the edge to the end of the cut hole is 7 mm or less, preferably 5 mm or less, e.g. 3 mm or less. That the groove is adjacent to an edge of the tearing finish edge side may typically mean that the distance from the edge to the end of the groove is 7 mm or less, preferably 5 mm or less, e.g. 3 mm or less.

The tear-aiding structure is not particularly limited at the tearing finish edge of the marginal part. In an embodiment, the tear-aiding structure can be generally the same at the tearing start edge and the tearing finish edge. This allows tearing to proceed in an arbitrary length direction of the protection sheet part as desired, thereby making the PSA sheet convenient for use.

The PSA sheet disclosed herein can be preferably made in an embodiment where the tear-off line forms a shape that has a segment running in the machine direction (MD) of the resin film forming the substrate of the PSA sheet, or simply the MD of the PSA sheet. The resin film is generally susceptible to tearing in a direction along its MD. Thus, it is suitable for a use mode in which the marginal part is torn off by pulling the marginal part in a peel direction of the PSA sheet. Here, that the tear-off line runs in the MD of the PSA sheet means that the angle between the MD and the direction in which the tear-off line runs is 45° or smaller (preferably 30° or smaller, more preferably 15° or smaller). According to the PSA sheet having a tear-off line in which the segment that runs continuously in such a direction is 50 mm or longer (e.g. 100 mm or longer), particularly great effects can be obtained by applying the art disclosed herein. It is preferable that a lateral side (i.e., running from the tearing start edge to the tearing finish edge) of the tear-off line has the segment that runs in such a direction. In a particularly preferable embodiment, the lateral side has a groove, more preferably the groove continuous or adjacent to the cut hole at the tearing start edge. In a long PSA sheet, usually, the resin film's MD generally coincides with the length direction of the PSA sheet.

The PSA sheet disclosed herein can be preferably made in an embodiment where the tear-off line is designed so that the MD of the PSA sheet, which may typically be the length direction in a long PSA sheet, is the length direction of the protection sheet part. According to such an embodiment, by pulling the marginal part of the PSA sheet generally along the MD, the marginal part can be easily and precisely torn off to form a nice-looking protection sheet.

In the tear-off line of the PSA sheet disclosed herein, it is preferable that a lateral side of the tear-off line, which is a segment of the tear-off line running from the tearing start edge to the tearing finish edge, is free of a part where the direction in which the segment runs turns to the tearing start edge side. In other words, the lateral side segment of the tear-off line is preferably free of a part where an angle larger than 90° is formed between the straight line (possibly almost parallel to the MD of the PSA sheet) running from the tearing start edge to the tearing finish edge and the direction in which the lateral side runs. This angle is preferably 60° or smaller (more preferably 45° or smaller, e.g. 30° or smaller). When the lateral side segment of the tear-off line has a part where the angle is larger than 60°, it is preferable that a cut hole (e.g. a slit) is formed at the turning point of the segment as the tear-aiding structure. By this, regardless of the presence of such a part, the resulting protection sheet tends to have a highly precise circumferential shape and a good appearance.

<Tensile Modulus>
(Tensile Modulus $E_R$)

In the PSA sheet having a groove as the tear-aiding structure, the resin material forming the groove bottom in the substrate is not particularly limited in tensile modulus (or bottom elastic modulus, hereinafter) $E_R$. From the standpoint of improving the handling properties of the PSA sheet before applied to an adherend, the bottom elastic modulus $E_R$ is preferably 200 MPa or greater. The bottom elastic modulus $E_R$ can be, for instance, 200 MPa to 4000 MPa, 200 MPa to 2000 MPa, or even 200 MPa to 1000 MPa.

In a preferable embodiment, the bottom elastic modulus $E_R$ can be 300 MPa or greater. When the PSA sheet is torn in the thickness direction along the groove, a higher bottom elastic modulus $E_R$ can effectively reduce frays and splinters which can be formed when the resin material forming the groove bottom is partially stretched. Thus, the resulting protection sheet tends to have a highly precise shape and a good appearance. From such a standpoint, the bottom elastic modulus $E_R$ can be 400 MPa or higher, or even 500 MPa or higher. In an embodiment, the bottom elastic modulus $E_R$ can be 650 MPa or higher, or even 750 MPa or higher. The bottom elastic modulus $E_R$ can be adjusted by the composition of the resin material forming the groove bottom, the production method and conditions of the resin film, etc.

(Tensile Modulus $E_T$)

The tensile modulus (or overall elastic modulus, hereinafter) $E_T$ of the entire resin film forming the substrate is not particularly limited. From the standpoint of enhancing the handling properties of the PSA sheet before applied to an adherend, the overall elastic modulus $E_T$ is preferably 200 MPa or higher (e.g. 200 MPa to 4000 MPa).

In an embodiment of the art disclosed herein, a preferable substrate may have an overall elastic modulus $E_T$ of 2000 MPa or lower, more preferably 1500 MPa or lower, e.g. 1000 MPa or lower. With decreasing overall elastic modulus $E_T$, the curved surface conformability of the protection sheet formed from the PSA sheet using the particular substrate tends to increase. From such a standpoint, the substrate may have an overall elastic modulus $E_T$ of 800 MPa or lower, or even 700 MPa or lower.

In an embodiment, a preferable substrate may have an overall elastic modulus $E_T$ of 300 MPa or higher, more preferably 400 MPa or higher, e.g. 500 MPa or higher. With increasing overall elastic modulus $E_T$ of the substrate, the shape precision and the appearance of the protection sheet formed upon tearing of the marginal part tend to increase. In the PSA sheet having a non-processed segment (e.g. possibly present between cut holes forming perforations or slits, or between a cut hole and a groove), it is particularly meaningful to increase the overall elastic modulus $E_T$ to inhibit fraying and splintering at the non-processed segment. The overall elastic modulus $E_T$ can be adjusted by the composition of the resin material forming the resin film, the structure of the resin film, the production method and conditions of the resin film, etc. In a substrate formed with a monolayer resin film, the bottom elastic modulus $E_R$ and the overall elastic modulus $E_T$ are the same.

The tensile moduli (bottom elastic modulus $E_R$ and overall elastic modulus $E_T$) refer to the tensile moduli determined based on JIS K 7161, using, as a measurement sample, a monolayer resin film formed of a resin material forming the part of interest. In particular, with the MD being the length direction, the resin film is cut to a 10 mm wide strip to prepare a test piece. Based on JIS K 7161:1994, at 23° C. and 50% RH, the test piece is stretched at a tensile speed of 300 mm/min, at a chuck distance of 50 mm to obtain a stress-strain curve. The tensile elastic modulus can be determined by linear regression of the curve between two prescribed strain points ε1 and ε2. The same method is also employed in Examples described later. The thickness of the resin film used as the measurement sample is not particularly limited. It is usually suitable to use a resin film having a thickness of about 20 μm to 100 μm (e.g. about 40 μm).

<180° Peel Strength>

In the PSA sheet disclosed herein, the 180° peel strength (or simply the peel strength, hereinafter) of the protection sheet part is not particularly limited. From the standpoint of adequately protecting the adherend surface, for instance, it is usually suitably about 0.5 N/25 mm or greater, typically about 1 N/25 mm or greater. In a preferable embodiment, the protection sheet part of the PSA sheet can have a peel strength of, for instance, 3 N/25 mm or greater, 4 N/25 mm or greater, or even 5 N/25 mm or greater. With the protection sheet having at least a certain level of peel strength, when the marginal part is torn off by pulling it in a peel direction, the protection sheet part is less likely to lift off the adherend surface, whereby stable tearing of the marginal part is facilitated. This may increase the circumferential shape precision and the appearance of the protection sheet formed upon the tearing. From the standpoint of the ease of redoing the application when applying the protection sheet part to an adherend and of the removability when peeling the PSA sheet off the adherend after it has finished serving for protection, the peel strength of the PSA sheet is usually suitably 20 N/25 mm or less, or preferably 15 N/25 mm or less (e.g. 10 N/25 mm or less).

The 180° peel strength of the protection sheet part is determined as follows: In particular, the protection sheet part of the PSA sheet is cut to a 25 mm wide strip to prepare a measurement sample. In an environment at 23° C. and 50% RH, the adhesive face of the measurement sample is press-bonded to the surface of a stainless steel plate (SUS430 BA plate) with a 2 kg roller moved back and forth once. The resultant is left standing in the same environment for 30 minutes. Subsequently, using a tensile tester, based on JIS Z 0237:2000, the peel strength (N/25 mm) of the measurement sample is determined at a tensile speed of 300 mm/min at a peel angle of 180°. As the tensile tester, for instance, a tensile/compression tester TG-1 kN (available from Minebea Co., Ltd.) can be used. The same method is also used in Examples described later. For instance, the peel strength of the protection sheet part can be adjusted by the composition and the thickness of the PSA layer.

In an embodiment where the marginal part of the PSA sheet has a PSA layer, the peel strength of the marginal part is not particularly limited. For instance, the peel strength of the marginal part can be comparable to the peel strength of the protection sheet part.

<Positioning Assistant>

The PSA sheet disclosed herein may include a positioning assistant to assist positioning of the PSA sheet. The positioning assistant can typically be thought as a feature that is useful in putting the protection sheet part in place on an adherend with proper alignment. As long as it can serve such a function, the form of the positioning assistant is not particularly limited. The positioning assistant can be, for instance, a structural feature that is provided to the PSA sheet where it is in a certain location relative to the protection sheet part and is engaged with an alignment guide for proper alignment. Favorable examples of the structural feature include a though hole, a notch, a depression and a protrusion provided to the PSA sheet. These types of positioning assistant are preferably placed in the marginal part. This enables efficient positioning of the protection sheet without impairing the protective function of the protection sheet part. For the PSA sheet in a roll form, from the standpoint of the workability, as in the example shown in FIG. 1, it is preferable to select an embodiment where positioning assistants are placed on the front edge side of the PSA sheet relative to the protection sheet part. The form of the positioning assistant is not limited to this example. For instance, it can be an optically detectable marking (e.g. a coloration printed or directly marked), an arranged separate member (e.g. an adhered identification label, a fixed element that allows signal transmission or reflection), etc. As long as its form (e.g. the marking, etc.) does not impair the protective function of the protection sheet part, the positioning assistant can be provided to the protection sheet part or to both the marginal part and the protection sheet part.

<Dimensions, etc. of PSA Sheet>

The PSA sheet disclosed herein can have a width in accordance with the dimensions of the protected region so that the marginal part can be torn off the protection sheet part in corresponding dimensions, and the width is not particularly limited. From the standpoint of the ease of application to adherends, the width of the PSA sheet is usually suitably about 150 cm or less, preferably 100 cm or less, or possibly 80 cm or less (e.g. 60 cm or less). The width of the PSA sheet can be, for instance, 5 cm or greater, 10 cm or greater, or even 20 cm or greater.

The length of the PSA sheet (typically wound in a roll) disclosed herein can be, for instance, 1 m or greater, 5 m or greater, or even 10 m or greater. In an embodiment, the length of the PSA sheet can be 100 m or greater (e.g. 200 m or greater, or even 300 m or greater). A longer PSA sheet can be provided with a larger number of protection sheet parts in the length direction. In other words, a larger number of protection sheets can be installed using one PSA sheet roll. This decreases the frequency of changing PSA sheet rolls, thereby increasing the productivity of adherends (e.g. members) bearing protection sheets. The maximum length of the PSA sheet is not particularly limited. For instance, it can be 2000 m or less.

In the PSA sheet disclosed herein, the dimensions of the protection sheet part can be designed in accordance with the dimensions of the protected region to which the protection sheet part is applied, and are not particularly limited. For instance, the protection sheet part may have dimensions such that the smallest rectangle enclosing the protection sheet part has a long side length $L_x$ of 5 cm or greater. According to an embodiment where the length $L_x$ is 10 cm or greater (e.g. 20 cm or greater), the effects of placing protection sheets by applying the art disclosed herein (e.g. one, two or more effects among more efficient placement of protection sheets, greater shape precision, and greater appearances) can be obtained to a greater extent. From the standpoint of the ease of tearing off the marginal part, the maximum length $L_x$ is usually suitably 150 cm or less, or it can be 100 cm or less (e.g. 80 cm or less). The smallest rectangle enclosing the protection sheet part may have a shape where the long side length $L_x$ is equal to the short side length $L_y$, that is, a square shape.

The protection sheet part may have a shape such that the long side length $L_x$ is 1.0 times to 100 times the short side length $L_y$, in the smallest rectangle enclosing the protection sheet part. The art disclosed herein can be preferably implemented in an embodiment where the long side $L_x$ may be equal to or greater than 1.05 times the short side length $L_y$. In a preferable embodiment, the long side length $L_x$ may be equal to or greater than 1.2 times (more preferably 1.5 times, e.g. 2 times) the short side length $L_y$. With the protection sheet part having such a shape, greater significance may be seen in tearing the marginal part off the protection sheet part by applying the art disclosed herein. The long side length $L_x$ can be equal to or greater than 5 times or even 10 times the short side length $L_y$. In an embodiment, the long side length $L_x$ can be equal to or less than 50 times or even 30 times the short side length $L_y$.

The protection sheet part in the PSA sheet disclosed herein can be oriented so that in the smallest rectangle enclosing the protection sheet part, the angle between a long side thereof and the length direction of the PSA sheet or the MD of the resin sheet forming the substrate of the PSA sheet is about 45° or smaller (preferably about 30° or smaller, more preferably about 15° or smaller, e.g. 5° or smaller). The angle can be substantially 0°.

The dimensions of the marginal part surrounding the protection sheet part bounded by the tear-off line are not particularly limited. For instance, from the standpoint of the ease of tearing off the marginal part by pulling it after the protection sheet part is applied to an adherend (e.g. in view of the ease of holding and the strength of the marginal part), the width of the narrowest part of the marginal part is usually suitably 5 mm or greater, or it can be preferably 10 mm or greater, or more preferably 20 mm or greater. From the standpoint of reducing wastes, the width of the narrowest part of the marginal part can be, for instance, 500 mm or less.

<Substrate>

The substrate of the PSA sheet disclosed herein comprises a resin film as the primary component. The PSA sheet formed with such a substrate is suited for a use mode as described earlier in which the marginal part of the PSA sheet is pulled in a peel direction to tear it off, with the protection sheet part adhered on an adherend. With the protection sheet part left on the adherend, a protection sheet suited to protect the adherend can be formed. As used herein, the substrate comprises a resin film as the primary component means that the resin film accounts for more than 50% of the substrate by weight. The substrate formed with the resin film, possibly having a surface subjected to a surface treatment such as release treatment and primer coating, is a representative example of the substrate that comprises a resin film as the primary component. The resin film forming the substrate may have a monolayer structure or a multilayer structure.

As used herein, the resin film refers to a film obtainable by molding a film from a resin composition primarily comprising a resin as those described below; its concept is distinguished from so-called non-woven fabrics and woven fabrics (i.e. the concept excludes non-woven fabrics and woven fabrics). A substantially non-foamed resin film is preferable. Here, the non-foamed resin film refers to a resin film that has not been subjected to an intentional foaming process. In particular, it can be a resin film having an expansion ratio below about 1.1 (e.g. below 1.05, typically below 1.01).

Examples of the resin forming the resin film include polyolefinic resin (polyethylene, polypropylene, ethylene-propylene copolymer, ethylene-vinyl acetate copolymer, etc.), polyester-based resin (polyethylene terephthalate, polybutylene terephthalate, polyethylene naphthalate, polybutylene naphthalate, etc.), vinyl chloride resin (typically soft vinyl chloride resin), vinyl acetate resin, polyurethane-based resin (ether-based polyurethane, ester-baser polyurethane, carbonate-based polyurethane, etc.), urethane (meth)acrylate, thermoplastic elastomer (olefinic elastomer, styrene-based elastomer, acrylic elastomer, etc.), polycarbonate resin, polyamide resin and polyimide resin. These resins can be used singly as one species or in a combination of two or more species.

The PSA sheet disclosed herein can be preferably made in an embodiment having a substrate that comprises, for instance, a polyolefinic resin film or a polyester-based resin film as the primary component. A particularly preferable substrate comprises a polyolefinic resin film as the primary component. Here, the polyolefinic resin film refers to a resin film whose primary component is polyethylene (PE) resin and/or polypropylene (PP) resin. The polyolefinic resin film may comprise PE resin and PP resin in a combined amount of greater than 50% (preferably 70% or more, e.g. 85% or more) by weight of the polyolefin resin film.

The primary component of the PP resin can be a propylene-based polymer of various types comprising propylene as a monomer. The PP resin may be essentially formed of one, two or more species of propylene-based polymer. Besides homopolypropylenes, the concept of propylene-based polymer encompasses a random polypropylene (random copolymer of propylene and other monomer(s)) and a block polypropylene (block copolymer of propylene and other monomer(s)). For instance, the concept of propylene-based polymer here includes the following species:

Propylene homopolymers (homopolypropylenes) such as isotactic polypropylenes;

Random copolymers (random polypropylenes) of propylene and other α-olefin(s) (typically, one, two or more species selected from ethylene and α-olefins having 4 to 10 carbon atoms); preferably, random polypropylenes formed from propylene as the primary monomer (the main monomer, i.e. a component accounting for at least 50% by weight of all monomers).

Block copolymers (block polypropylenes) obtained by block copolymerization of propylene and other α-olefin(s) (typically, one, two or more species selected from ethylene and α-olefins having 4 to 10 carbon atoms); preferably, block polypropylenes comprising propylene as the primary monomer (the main monomer, i.e. a component accounting for at least 50% by weight of all monomers).

The primary component of the PE resin can be an ethylene-based polymer of various types comprising ethylene as a monomer. It can be a PE resin essentially formed of one, two or more species of ethylene-based polymer. The ethylene-based polymer can be an ethylene homopolymer or a copolymerization product (e.g. random copolymer or block copolymer) of ethylene as the primary monomer and other α-olefin(s) as the secondary monomer(s). Preferable examples of the α-olefin include α-olefins with 3 to 10 carbon atoms such as propylene, 1-butene (possibly a branched 1-butene), 1-hexene, 4-methyl-1-pentene, and 1-octene. For instance, a preferable PE resin comprises, as the primary component, an ethylene-based polymer in which an α-olefin as the secondary monomer is copolymerized up to 10% (typically up to 5%) by weight.

The PE resin can be obtainable by copolymerization of ethylene and a functional monomer (a monomer containing other functional group(s) in addition to a polymerizing functional group), by copolymerization of such a functional monomer with an ethylene-based polymer, etc. Examples of a copolymer of ethylene and a functional monomer include ethylene-vinyl acetate copolymers (EVA), ethylene-acrylic acid copolymers (EAA), ethylene-methacrylic acid copolymers (EMAA), ethylene-methyl acrylate copolymers (EMA), ethylene-ethyl acrylate copolymers (EEA), ethylene-methyl methacrylate copolymers (EMMA), and ethylene-(meth)acrylic acid copolymers (i.e., copolymers obtainable from ethylene and acrylic acid and/or methacrylic acid) crosslinked by metal ions.

The density of the PE resin is not particularly limited. The concept of PE resin here includes high-density polyethylene (HDPE), medium-density polyethylene (MDPE), low-density polyethylene (LDPE) and linear low-density density polyethylene (LLDPE). In an embodiment, the PE resin has a density of, for instance, about 0.90 $g/cm^3$ to 0.94 $g/cm^3$. Preferable PE resins include LDPE and LLDPE.

Although no particular limitations are imposed, as the polyolefin resin material, a species having a MFR (melt flow rate) in a range of about 0.5 g/10 min to 80 g/10 min (e.g. 0.5 g/10min to 10 g/10 min) can be preferably used. Here, the MFR refers to the value determined based on JIS K 7210 by method A at a temperature of 230° C. at an applied load of 21.18 N.

The polyolefin resin film preferably comprises at least PP resin as the polyolefin resin. For instance, a preferable polyolefin resin film has a composition including at least 20% PP resin by weight (more preferably at least 30% by weight). Such a composition can favorably bring about a resin film having a bottom elastic modulus $E_R$ and an overall elastic modulus $E_T$ suited for preventing fraying and splintering.

In an embodiment, it is preferable to use a polyolefin resin film in which a continuous structure (a continuous phase) of PP resin is formed. In a multilayer resin film, at least one layer is preferably a layer having a continuous phase of a PP resin. The layer having a continuous phase of PP resin is preferably placed to form first and/or second faces of the resin film. With the use of the resin film in such an embodiment, when the tear-aiding structure includes a groove and the groove bottom is formed with the layer having a continuous phase of PP resin, the resulting protection sheet can have a highly precise shape and a good appearance.

The number of layers in the multilayer resin film can be, for instance, about 2 to 5. For instance, a preferable resin film has a three-layer structure with a front layer forming a first face (the surface on which the PSA layer is placed) of the substrate, a back layer forming a second face (back face) of the substrate, and a middle layer placed between them. In an embodiment, one or each (preferably each) of the front and back layers can be formed from a resin material having a higher tensile modulus than that of the middle layer. Such an embodiment can bring about a PSA sheet more favorably combining easy tear-off nature of the marginal part and curved surface conformability of the protection sheet.

Although no particular limitations are imposed, for instance, the three-layer resin film can be formed so that the thickness of the middle layer accounts for about 20% to about 80% (preferably about 30% to about 70%) of the overall thickness of the resin film. In an embodiment, the front and back layers can be generally comparable in thickness. For instance, the thickness of the front layer is preferably about 0.5 times to 1.5 times the thickness of the back layer. The front and back layers can have essentially the same thickness.

To the resin film, inorganic powder can be added as necessary. This can block light such as UV rays to inhibit photodegradation of the substrate and the PSA layer. As the inorganic powder, oxides such as titanium oxide, zinc oxide, magnesium oxide, alumina and silica; carbonates such as calcium carbonate; sulfates such as barium sulfate; and the like can be used.

A favorable example of the inorganic powder is titanium dioxide ($TiO_2$). The type of titanium dioxide is not particularly limited. For instance, titanium dioxide in any crystal form such as rutile, anatase and brookite can be used. In particular, rutile titanium dioxide is preferable. Titanium dioxide having coated particle surfaces can be used as well. The coating material of the titanium dioxide particles is not particularly limited. For instance, it can be an inorganic oxide such as silica, alumina and zinc oxide. Favorable examples include highly weather-resistant titanium dioxide (typically rutile titanium dioxide) having particle surfaces coated with $Si$—$Al_2O_3$, etc.

From the standpoint of obtaining good light-blocking effects, the amount of the inorganic powder added is suitably 5% by weight or more of the entire substrate, preferably 6% by weight or more, or more preferably 7% by weight or more. In view of the strength and the ease of molding of the substrate, etc., the inorganic powder content is suitably 30% by weight or less of the entire substrate, preferably 20% by weight or less, or more preferably 15% by weight or less. In the multilayer resin film, the inorganic powder may be added only to some of the layers or to all layers in the same proportions or in different proportions.

To the substrate, as necessary, known additives that can be used in plastic film for PSA sheet substrates can be suitably added, such as weatherability enhancers (UV absorber, antioxidant, photostabilizer, etc.), antistatic agent and slip agent. Examples of photostabilizer include those containing benzotriazoles, hindered amines and benzoates as active ingredients. Examples of antioxidant include those containing alkylphenols, alkylene bisphenols, thiopropionic acid esters, organic phosphorous acid esters, amines, hydroquinones and hydroxylamines as active ingredients. These additives can be used singly as one species or in a combination of two or more species. The additives can be added in amounts about the same as usual amounts in resin film for PSA sheet substrates.

The thickness of the substrate is not particularly limited and can be suitably selected in accordance with the purpose. For instance, a substrate having a thickness of about 300 µm or less can be used. From the standpoint of the conformability to contours of the adherend surface, etc., the thickness of the substrate can be, for instance, 200 µm or less, or it is suitably 100 µm or less, preferably 75 µm or less, or more preferably 50 µm or less. The thickness of the substrate can be, for instance, 10 µm or grater. From the standpoint of the strength, the handling properties and the light-blocking properties, it is suitably 15 µm or greater, preferably 20 µm or greater, or more preferably 25 µm or greater (e.g. 30 µm or greater).

The polyolefin resin film may be obtained by molding a sheet by a heretofore known method from a resin material that comprises resins including a polyolefin resin, inorganic powder and other materials (additives, etc.) used as necessary. For example, the polyolefin resin film can be produced by suitably employing a heretofore known general film-molding method such as extrusion molding and inflation molding. From the standpoint of the ease of tearing off the marginal part and the appearance of the protection sheet, etc., an extrusion method can be preferably used as the method for forming the resin film.

The face of the substrate to be provided with the PSA layer may be subjected to a known or commonly used surface treatment such as corona discharge treatment, plasma treatment, UV ray irradiation, acid treatment, alkali treatment and primer coating. Such a surface treatment may enhance adhesion between the substrate and the PSA layer, that is, the anchoring of the PSA layer to the substrate. In a preferable surface treatment, a polar group such as hydroxy group (—OH) is introduced to the front face of the substrate. This can increase the anchoring of the PSA layer and further increase the anti-residue properties.

The second face (back face) of the substrate opposite from the face provided with the PSA layer may be subjected, as necessary, to a surface treatment such as antistatic treatment, release treatment and water repellent treatment. The release treatment provided to the back face of the substrate brings about effects such as easier unwinding of the PSA sheet wound in a roll, etc. The release treatment may involve formation of a release layer on the back face of the substrate using various types of release agent such as silicone-based, long-chain alkyl-based, fluorine-based release agents and molybdenum sulfide.

<PSA Layer>

The type of PSA forming the PSA layer in the PSA sheet disclosed herein is not particularly limited. For instance, the PSA layer may comprise one, two or more species of PSA selected among various known PSAs such as a rubber-based PSA (natural rubber-based, synthetic rubber-based, their mixture-based, etc.), acrylic PSA, polyester-based PSA, urethane-based PSA, polyether-based PSA, silicone-based PSA, polyamide-based PSA, and fluorine-based PSA. Here, the rubber-based PSA refers to a PSA comprising a rubber-based polymer as the base polymer. The same applies to the other PSAs. The base polymer of a PSA refers to the primary component among rubbery polymers (polymers that exhibit rubber elasticity in a room temperature range) in the PSA, typically a component that accounts for more than 50% (e.g. possibly 70% or more, or even 90% or more) by weight of the polymers.

(Rubber-Based PSA)

In a preferable embodiment, the PSA layer is a rubber-based PSA layer formed of a rubber-based PSA comprising a rubber-based polymer as the base polymer (the primary component among polymers). Examples of the base polymer in a rubber-based PSA include various rubber-based polymers such as natural rubber; styrene-butadiene rubber (SBR); polyisoprene; butyl rubbers such as regular butyl rubber, chlorinated butyl rubber, and brominated butyl rubber; isobutylene-based polymers such as polyisobutylene, isoprene-isobutylene copolymer and a modified product thereof; an A-B-A block copolymer rubber and a hydrogenation product thereof, such as a styrene-butadiene-styrene block copolymer rubber (SBS), styrene-isoprene-styrene block copolymer rubber (SIS), styrene-vinylisoprene-styrene block copolymer rubber (SVIS), styrene-ethylene-butylene-styrene block copolymer rubber (SEBS) which is a hydrogenation product of SBS, and styrene-ethylene-propylene-styrene block copolymer rubber (SEPS) which is a hydrogenation product of SIS.

The art disclosed herein can be preferably implemented in an embodiment comprising a PSA layer formed of a non-crosslinked PSA. Examples of the non-crosslinked PSA include a PSA comprising an ABA-type block copolymer rubber or its hydrogenation product as the base polymer, a PSA comprising an isobutylene-based polymer as the base polymer, and the like. Among these, a preferable PSA layer is constituted with a polyisobutylene-based non-crosslinked PSA formed from a PSA composition comprising an isobutylene-based polymer as the base polymer. A non-crosslinked PSA layer is less likely to apply stress on the surface of an adherend and also less likely to leave adhesion marks. Thus, it is favorable as the PSA layer for the protection sheet The isobutylene-based polymer may be an isobutylene homopolymer (homopolyisobutylene) or a copolymer based on isobutylene as a primary monomer. Examples of the copolymer include a copolymer of isobutylene and normal butylene, copolymer of isobutylene and isoprene (regular butyl rubber, chlorinated butyl rubber, brominated butyl rubber, partially crosslinked butyl rubber, etc.), vulcanized products or modified products of these (e.g. products modified with a functional group such as hydroxyl group, carboxyl group, amino group, epoxy group, etc.), and the like. From the standpoint of the stability of adhesive strength (e.g., non-susceptibility to an excessive increase in the adhesive strength due to aging or a thermal history), preferably usable isobutylene-based polymers include a isobutylene homopolymer and an isobutylene-normal butylene copolymer. In particular, a isobutylene homopolymer is preferable.

The molecular weight of the isobutylene-based polymer is not particularly limited. For instance, an isobutylene-based polymer having a weight average molecular weight (Mw) of about $1 \times 10^4$ to $150 \times 10^4$ can be suitably selected and used. Two or more isobutylene-based polymers having individually different Mw values may be used in combination. As a whole, the isobutylene-based polymer for use has a Mw value in a range of preferably about $10 \times 10^4$ to $150 \times 10^4$, more preferably about $30 \times 10^4$ to $120 \times 10^4$, typically $40 \times 10^4$ to $105 \times 10^4$, e.g. about $50 \times 10^4$ to $100 \times 10^4$.

The polyisobutylene-based PSA may comprise, as its base polymer(s), one, two or more species selected from these isobutylene-based polymers. In addition to the base polymer, the polyisobutylene-based PSA may comprise, as a secondary component, a non-polyisobutylene-based polymer. Examples of such a polymer include a poly(meth)acrylic acid ester, polybutadiene, polystyrene, polyisoprene, polyurethane, polyacrylonitrile, polyamide, etc. The non-polyisobutylene-based polymer content is usually preferably 10% by weight or less of the total polymer content in the polyisobutylene-based PSA. The PSA may be essentially free of a non-polyisobutylene-based polymer.

The PSA can include a tackifier as necessary. Examples of preferably usable tackifiers include tackifier resins such as rosin-based resins, terpene-based resins, petroleum resins, phenol resins, alkylphenol resins, xylene resins, coumarone-indene resins, alkyd resins, epoxy resins, and hydrogenation products of these. These tackifiers can be used singly as one species or in a suitable combination of two or more species.

In a preferable embodiment, the PSA disclosed herein may comprise a tackifier resin $T_{hs}$ having an SP value of 8.5 or higher (in $(cal/cm^3)^{1/2}$; the same applies hereinafter). As the tackifier resin $T_{hs}$, for instance, a tackifier resin having an SP value in a range of 8.5 to 15 can be preferably used. For instance, a phenolic compound, an amine-based compound, a rosin-based resin (e.g. unmodified rosin) and the like having such SP values can be used as the tackifier resin $T_{hs}$. For the tackifier resin $T_{hs}$, solely one species or a suitable combination of two or more species can be used. Such a tackifier resin $T_{hs}$ can be used in a small amount and may effectively increase the adhesive strength. Thus, it is suited for combining higher adhesive strength to an adherend and a lower risk of contamination on the adherend surface.

Here, the SP value indicates the solubility of a compound and is a value determined from the basic structure of the compound by the method proposed by Fedors. In particular, from the vaporization energy $\Delta e$ (cal) of each atom or atomic group at 25° C. as well as the molar volume $\Delta v$ (cm³) of the atom or atomic group at the same temperature, the SP value is determined by the next equation:

$$SP \text{ value}(\delta) = (\Sigma \Delta e / \Sigma \Delta v)^{1/2}$$

(Reference: Hideki Yamamoto, "*SP value fundamentals, application, and calculation method*" (4th edition) published by Johokiko Co., Ltd., Apr. 3, 2006, pp. 66-67).

Favorable examples of the phenolic compound that can be used as the tackifier resin $T_{hs}$ include phenol resins, alkylphenol resins, rosin-modified phenolic resins and terpene-modified phenol resins. A preferable alkyl phenol resin has a side-chain alkyl group with three or more carbon atoms (typically with 3 to 18, e.g. 5 to 12 carbon atoms), such as tert-butylphenol resin, tert-amylphenol resin and tert-octylphenol resin. A favorable example of the tackifier resin $T_{hs}$ used in the PSA in the art disclosed herein is a phenolic compound having an SP value of 9.5 or higher (typically 9.5 to 15, e.g. 10 to 15). An example of the phenolic compound is trade name DUREZ 19900 available from Sumitomo Durez Co., Ltd. In typical, the tackifier resin $T_{hs}$ is a material whose purpose does not involve UV ray absorption, or radical trapping or stabilization in a photodegradation reaction. Thus, the tackifier resin $T_{hs}$ is distinguished from materials generally used as antioxidant or photostabilizer.

In an embodiment using a tackifier, its amount used can be, for instance, about 0.1 to 50 parts by weight relative to 100 parts by weight of the base polymer. It is usually preferable that the amount added relative to 100 parts by weight of the base polymer is 0.1 to 5 parts by weight. Alternatively, the PSA may have a composition essentially free of a tackifier.

When a tackifier resin $T_{hs}$ with a high SP value is used, its amount used is usually suitably 5 parts or less (e.g. 2.5 parts or less) by weight to 100 parts by weight of the base polymer, or preferably 1.0 part or less (typically, 0.01 part to 1.0 part) by weight. The art disclosed herein can be preferably implemented in an embodiment where the tackifier resin $T_{hs}$ content in the PSA is 0.8 part or less (more preferably 0.5 part or less, e.g. 0.01 part to 0.4 part) by weight to 100 parts by weight of the base polymer. From the standpoint of obtaining favorable effects of the tackifier resin $T_{hs}$, the lower limit of the tackifier resin $T_{hs}$ content is preferably 0.05 part or higher (e.g. 0.1 part or higher, typically 0.2 part or higher) by weight to 100 parts by weight of the base polymer.

(Acrylic PSA)

In another preferable embodiment, the PSA layer is an acrylic PSA layer formed of an acrylic PSA comprising an acrylic polymer as the base polymer. Such an acrylic PSA layer can be preferably used from the standpoint of the transparency, etc.

A preferable acrylic polymer is, for instance, a polymer formed from a starting monomer mixture that comprises an alkyl (meth)acrylate as the primary monomer and possibly a secondary monomer copolymerizable with the primary monomer. Here, the primary monomer refers to a component that accounts for more than 50% by weight of the total monomer content in the starting monomer mixture. As used herein, the (meth)acrylate comprehensively refers to acrylate and methacrylate.

As the alkyl (meth)acrylate, for instance, a compound represented by the formula (1) below can be suitably used:

$$CH_2=CR^1COOR^2 \qquad (1);$$

Here, $R^1$ in the formula (1) is a hydrogen atom or a methyl group. $R^2$ is an acyclic alkyl group having 1 to 20 carbon atoms (hereinafter, such a range of the number of carbon atoms may be indicated as $C_{1-20}$). From the standpoint of the storage elastic modulus of the PSA, etc., an alkyl (meth)acrylate wherein $R^2$ is a $C_{1-14}$ (e.g. $C_{2-10}$, typically $C_{4-9}$) acyclic alkyl group is preferable. An alkyl acrylate wherein $R_1$ is a hydrogen atom and $R^2$ is a $C_{4-9}$ acyclic alkyl group is more preferable.

Examples of the alkyl (meth)acrylate wherein $R^2$ is a $C_{1-20}$ acyclic alkyl group include methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, pentyl (meth)acrylate, isopentyl (meth)acrylate, hexyl (meth)acrylate, heptyl (meth)acrylate, 2-ethylhexyl (meth)acrylate, octyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, lauryl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate and eicosyl (meth)acrylate. These alkyl (meth)acrylates may be used singly as one species or in a combination of two or more species. Particularly preferable alkyl (meth)acrylates include n-butyl acrylate (BA) and 2-ethylhexyl acrylate (2EHA). Preferably, either BA or 2EHA can be used alone or the two can be used in combination.

The primary monomer content in all the monomers is preferably about 70% by weight or higher (e.g. about 85% by weight or higher, typically about 90% by weight or higher). It is usually preferably about 99.5% by weight or lower (e.g. about 99% by weight or lower). When a $C_{4-9}$ alkyl acrylate is used as a monomer, the $C_{4-9}$ alkyl acrylate content of the alkyl (meth)acrylates in the monomers is preferably about 70% by weight or higher, more preferably about 90% by weight or higher, or yet more preferably about 95% by weight or higher. It can be about 99% by weight or higher, and about 100% by weight or lower. In a preferable embodiment, the monomers include at least BA or 2EHA. The art disclosed herein can be preferably implemented, for instance, in an embodiment where the combined amount of BA and 2EHA is about 50% by weight or more (typically about 70% by weight or more, e.g. about 90% by weight or more) of all the monomers.

The secondary monomer copolymerizable with the alkyl (meth)acrylate as the primary monomer may be useful for introducing crosslinking points into the acrylic polymer and for increasing the cohesive strength of the acrylic polymer. As the secondary monomer, one, two or more species can be used among functional group-containing monomers such as carboxy group-containing monomers, hydroxy group-containing monomers, acid anhydride group-containing monomers, amide group-containing monomers, amino group-containing monomers, keto group-containing monomers, monomers having N-containing rings, alkoxysilyl group-containing monomers, imide group-containing monomers, and epoxy group-containing monomer. From the standpoint of increasing the cohesive strength, etc., an acrylic polymer in which a carboxy group-containing monomer and/or a hydroxy group-containing monomer are copolymerized as the secondary monomer is preferable. Favorable examples of the carboxy group-containing monomer include acrylic acid and methacrylic aid. Favorable examples of the hydroxy group-containing monomer include hydroxyalkyl (meth)acrylates such as 2-hydroxyethyl acrylate and 4-hydroxybutyl acrylate.

The amount of the secondary monomer can be suitably selected to obtain desirable cohesive strength and is not particularly limited. Usually, from the standpoint of combining well-balanced adhesive strength and cohesive strength, the amount of the secondary monomer is suitably about 0.5% by weight or more of the total monomer content in the acrylic polymer, or preferably about 1% by weight or more. The amount of the secondary monomer is usually suitably about 30% by weight or less of the total monomer content, or preferably about 15% by weight or less (e.g. about 10% by weight or less).

In the acrylic polymer, other monomer(s) may be copolymerized as far as the effects of the invention are not impaired. For instance, these other monomers can be used for adjusting the glass transition temperature of the acrylic polymer, adjusting the adhesive properties (e.g. removability), etc. Examples of a monomer that may increase the cohesive strength of the PSA include sulfonate group-containing monomers, phosphate group-containing monomers, cyano group-containing monomers, vinyl esters (vinyl acetate, vinyl propionate, vinyl laurate, etc.), and aromatic vinyl compounds. These other monomers can be used singly as one species or in a combination of two or more species. The other monomer content is preferably about 30% by weight or less (e.g. about 10% by weight or less) of the total monomer content. For instance, it can be about 0.01% by weight or more (typically about 0.1% by weight or more).

The method for obtaining the acrylic polymer is not particularly limited. The polymer can be obtained by applying various polymerization methods generally used for acrylic polymer synthesis, such as solution polymerization, emulsion polymerization, bulk polymerization, and suspension polymerization. The acrylic polymer can be a random copolymer, a block copolymer, a graft copolymer, etc. From the standpoint of the productivity, etc., a random copolymer is usually preferable.

The acrylic PSA can be formed, using a PSA composition that further comprises, in addition to the acrylic polymer, a known crosslinking agent, for instance, an epoxy-based crosslinking agent, isocyanate-based crosslinking agent, silane-based crosslinking agent, oxazoline-based crosslinking agent, aziridine-based crosslinking agent, and metal chelate-based crosslinking agent. For the crosslinking agent, solely one species or a suitable combination of two or more species can be used. The amount of the crosslinking agent used is not particularly limited. It can be selected to obtain desirable cohesive strength. Usually, the amount of the crosslinking agent used to 100 parts by weight of the acrylic polymer is suitably about 0.05 part to 10 parts (preferably 0.1 part to 10 parts, more preferably 0.3 part to 7 parts, e.g. 1 part to 5 parts) by weight.

To the PSA (e.g. a rubber-based PSA, an acrylic PSA, etc.) in the art disclosed herein, suitable components (additives) allowed for inclusion in the PSA can be added as necessary. Examples of the additives include softener, release-aiding agent, pigment or fillers, antioxidant, and photostabilizer. The concept of photostabilizer encompasses radical scavenger and UV ray absorber. These additives can be used singly as one species or in a combination of two or more species. The additives can be used, for instance, in amounts about the same as usual amounts added in the field of PSA used for protection sheets.

The PSA layer in the art disclosed herein may be formed from, for instance, a water-dispersed PSA composition, a solvent-based PSA composition, a hot-melt PSA composition or an active energy ray-curable PSA composition. The PSA layer can be formed based on a method for forming PSA layers known in the PSA sheet field. For instance, a direct method can be employed where the PSA composition is directly provided (typically applied) to the substrate and allowed to dry. Alternatively, a transfer method can be employed where the PSA composition is provided to a releasable surface (e.g. a release liner surface, the back face of a substrate pre-subjected to release treatment, etc.) and allowed to dry to form a PSA layer on the surface and the PSA layer is transferred to the substrate.

The thickness of the PSA layer is not particularly limited and can be suitably selected in accordance with the purpose. From the standpoint of the tightness of adhesion to the adherend surface, the thickness of the PSA layer is usually suitably 2 μm or greater, or preferably 3 μm or greater. In an embodiment, from the standpoint of likely obtaining adhesive strength (peel strength) suited for stable tearing of the marginal part, the thickness of the PSA layer is preferably 5 μm or greater (e.g. 7 μm or greater). From the standpoint of the removability and inhibiting an increase in adhesive strength with aging, the thickness of the PSA layer is usually suitably 100 μm or less, or preferably 30 μm or less, or it can also be 20 μm or less (e.g. 15 μm or less).

<Applications>

No particular limitations are imposed to the type of adherend (the object to be protected) to which the protection sheet part of the PSA sheet disclosed herein is applied. The adherend may have a surface formed of, for instance, a metallic material such as stainless steel (SUS), aluminum, and zinc-plated steel plate; an inorganic material such as glass and ceramic; a resin material such as polycarbonate resin, acrylic resin (typically, polymethyl methacrylate resin (PMMA)), cyclic polyolefin resin, phenol resin, acrylonitrile butadiene styrene copolymer (ABS), acrylonitrile styrene acrylate copolymer (ASA), polyphenylene ether resin, polystyrene resin, polyolefinic resin such as polyethylene and polypropylene, and polyethylene terephthalate (PET); a rubber material such as natural rubber, synthetic rubber, acrylic rubber, thermoplastic elastomer (e.g. olefinic thermoplastic elastomer, styrene-based thermoplastic elastomer); and a composite material of these. The adherend surface can also be a coated surface with an acrylic, polyester-based, alkyd-based, melamine-based, urethane-based, acid-epoxy cross-linking-based, their composite-based (e.g. acrylic melamine-based, alkyd melamine-based) paint, etc.

The adherend may be a material, a molded body, a component (member), a product and so on, formed using aforementioned materials. Although no particular limitations are imposed, the PSA sheet disclosed herein can be preferably used for protection purposes of various members. For instance, it is favorable in an application where the protection sheet formed from the protection sheet part of the PSA sheet is placed on the surface (the surface to be protected) of a member. A favorable example of the member is a member constituting a vehicle such as an automobile. Non-limiting examples of the vehicle constituting member include an exterior panel, a pillar, a window frame, an interior material, and a structural material of a vehicle body.

The surface state of the adherend is not particularly limited. In view of easy pulling and tearing of the marginal part after the protection sheet part of the PSA sheet is applied to the adherend, it can be preferably applied to an object to be protected having a smooth flat surface. For instance, a preferable adherend is the surface of a member having a smooth flat surface formed of a resin material (e.g. acrylic resin, ABS resin, polystyrene resin, etc.) or a glass material.

The matters disclosed herein includes the following:

(1) A PSA sheet comprising a substrate and a PSA layer placed on a first face of the substrate, wherein the PSA sheet comprises a protection sheet part to be adhered to an adherend to protect the adherend, a marginal part bounded from the protection sheet part by a tear-off line surrounding the protection sheet part, and a tear-aiding structure provided along the tear-off line;

the substrate comprises a resin film as its primary component, and the PSA sheet is configured so that after the protection sheet part is adhered to the adherend, when the marginal part is pulled in a direction in which the PSA sheet is peeled off the adherend, the marginal part is torn off the protection sheet part.

(2) The PSA sheet according to (1) above, being long and wound in a roll.

(3) The PSA sheet according to (1) or (2) above, wherein the surface of the PSA layer is separably in contact with the back face of the PSA sheet.

(4) The PSA sheet according to any of (1) to (3) above, comprising a plurality of the protection sheet parts serially arranged in the length direction of the PSA sheet.

(5) The PSA sheet according to any of (1) to (4) above, wherein the tear-aiding structure comprises at least a cut hole or a groove.

(6) The PSA sheet according to any of (1) to (5) above, wherein the tear-aiding structure comprises a groove running along the tear-off line.

(7) The PSA sheet according to (6) above, wherein the groove is formed on the back side of the substrate.

(8) The PSA sheet according to (6) or (7) above, wherein the groove bottom in the substrate is formed with a resin material having a tensile modulus of 300 MPa or greater.

(9) The PSA sheet according to any of (1) to (8) above, wherein the tear-aiding structure comprises a cut hole placed at a tearing start edge of the marginal part.

(10) The PSA sheet according to (9) above, wherein the tear-aiding structure comprises a groove formed continuously or adjacently to the cut hole placed at the tearing start edge of the marginal part.

(11) The PSA sheet according to any of (1) to (10) above, wherein the substrate comprises a polyolefinic resin film as the resin film.

(12) The PSA sheet according to any of (1) to (11) above, wherein the protection sheet part exhibits a 180° peel strength of 3 N/25 mm or greater.

(13) The PSA sheet according to any of (1) to (12) above, comprising a plurality of application units divided by separation lines.

(14) The PSA sheet according to (13) above, wherein each of the plurality of application units comprises at least one each of the protection sheet part and the marginal part surrounding the protection sheet part.

(15) The PSA sheet according to (13) or (14) above, being long and wound in a roll wherein the plurality of application units are serially arranged in the length direction of the PSA sheet, divided by separation lines running across the width of the PSA sheet.

(16) The PSA sheet according to any of (13) to (15) above, comprising separation-aiding structures formed along the separation lines.

(17) The PSA sheet according to any of (1) to (16) above having a positioning assistant to assist positioning of the PSA sheet.

(18) The PSA sheet according to (17) above, wherein the positioning assistant is provided to the marginal part.

(19) The PSA sheet according to any of (1) to (18) above, wherein the protection sheet part has a shape such that in the smallest rectangle enclosing the protection sheet part, the long side length $L_x$ is equal to or greater than 1.05 times the short side length $L_y$.

(20) The PSA sheet according to any of (1) to (19) above, wherein, in the smallest rectangle enclosing the protection sheet part, a long side thereof and the length direction of the PSA sheet or the MD of the resin sheet forming the substrate of the PSA sheet forms an angle of 45° or smaller

(21) The PSA sheet according to any of (1) to (20) above, wherein the substrate has a thickness of 10 μm or greater and 100 μm or less (e.g. 25 μm or greater and 75 μm or less).

(22) The PSA sheet according to any of (1) to (21) above, wherein the PSA layer has a thickness of 3 μm or greater and 30 μm or less (e.g. 5 μm or greater and 15 μm or less).

(23) The PSA sheet according to any of (1) to (22) above, wherein the PSA layer is formed from a non-crosslinked PSA.

(24) A method for producing a protection sheet-bearing member in which a protection sheet is adhered to a surface of a member, the method comprising:
obtaining a PSA sheet comprising a substrate whose primary component is a resin film and a PSA layer placed on a first face of the substrate wherein the PSA sheet comprises a protection sheet part to be adhered to an adherend to protect the adherend, a marginal part bounded from the protection sheet part by a tear-off line surrounding the protection sheet part, and a tear-aiding structure provided along the tear-off line;
adhering the protection sheet part to the member; and
pulling the marginal part in a direction in which the PSA sheet is peeled off the member, thereby tearing the marginal part off the protection sheet part leaving the protection sheet part on the member.

(25) A method for applying a protection sheet to a surface of a member, the method comprising:
obtaining a PSA sheet that comprises a substrate whose primary component is a resin film and a PSA layer placed on a first face of the substrate wherein the PSA sheet comprises a protection sheet part to be adhered to an adherend to protect the adherend, a tear-off line surrounding the protection sheet part, and a marginal part bounded from the protection sheet part by the tear-off line, and further comprises a tear-aiding structure provided along the tear-off line;
adhering the protection sheet part to the member; and
pulling the marginal part in a direction in which the PSA sheet is peeled off the member, thereby tearing the marginal part off the protection sheet to leave the protection sheet on the member.

EXAMPLES

Several worked examples relating to the present invention are described below, but the present invention is not intended to be limited to these examples. In the description below, "parts" and "%" are based on weight unless otherwise specified.

In the respective Examples, the following substrates and PSA compositions were used.

(Substrate S1)

Using a T-die film molder, a mold material (PP/PE) containing 70 parts of PP (homopolypropylene under trade name NOVATEC PP FY4 available from Japan Polypropylene Corporation, MFR=5.0; the same applies hereinafter) and 30 parts of PE (linear low density polyethylene (LLDPE) under trade name KERNEL KF380 available from Japan Polypropylene Corporation, density d=0.925 g/cm³; the same applies hereinafter) was melted, kneaded, and extruded to obtain a 40 μm thick monolayer resin film. The back face of the resin film was treated with a long-chain alkyl release agent and the resultant was used as a substrate S1.

For each of the mold materials used in fabricating the substrate S1 and the following substrates S2 to S6, to 100 parts of the resin material, was added 10 parts of $TiO_2$ ($Si$—$Al_2O_3$-coated rutile titanium dioxide under trade name TIPAQUE CR-95 available from Ishihara Sangyo Kaisha, Ltd.).

(Substrate S2)

Using a T-die film molder, PP and PE were melted, kneaded, and co-extruded in three layers to obtain a three-layer resin film (40 μm thick) having a middle layer formed of PE between back and front layers formed of PP. The back, middle and front layers were 10 μm, 20 μm and 10 μm in thickness, respectively. The back face of the resin film was subjected to the same release treatment as the substrate S1 and the resultant was used as a substrate S2.

(Substrate S3)

Using a T-die film molder, PP and PE were melted, kneaded, and co-extruded in three layers to obtain a three-layer resin film (40 μm thick) having a middle layer formed of PP between back and front layers formed of PE. The back, middle and front layers were 10 μm, 20 μm and 10 μm in thickness, respectively. The back face of the resin film was subjected to the same release treatment as the substrate S1 and the resultant was used as a substrate S3.

(Substrate S4)

Using a T-die film molder, PP was extruded to obtain a 40 μm thick monolayer resin film. The back face of the resin film was subjected to the same release treatment as the substrate S1 and the resultant was used as a substrate S4.

(Substrate S5)

Using a T-die film molder, PE was extruded to obtain a 40 μm thick monolayer resin film. The back face of the resin film was subjected to the same release treatment as the substrate S1 and the resultant was used as a substrate S5.

(Substrate S6)

Using a T-die film molder, a mold material (PP/PE) containing 70 parts of PP and 30 parts of PE and a mold material (PE/PP) containing 70 parts of PE and 30 parts of PP were melted, kneaded and extruded to obtain a three-layer resin film (40 μm thick) having a middle layer formed of PP/PE between back and front layers formed of PE/PP. The back, middle and front layers were 10 μm, 20 μm and 10 μm in thickness, respectively. The back face of the resin film was subjected to the same release treatment as the substrate S1 and the resultant was used as a substrate S6.

(Substrate S7)

The back face of trade name LUMIRROR S105 (38 μm thick) available from Toray Industries, Inc. was subjected to the same release treatment as the substrate S1 and the resultant was used as a substrate S7.

The overall elastic moduli $E_T$ of the substrates according to the respective Examples were determined by the method described earlier. With respect to each three-layer substrate, the resin material for forming its front layer was used to form a 40 μm thick monolayer resin film. Using this resin film as a measurement sample, the bottom elastic modulus $E_R$ was determined by the method described earlier. The results are shown in Tables 1 and 2. Here, as the bottom elastic modulus $E_R$ of a monolayer substrate, the same value as the overall elastic modulus $E_T$ of the substrate is shown.

(PSA Composition A1)

In an organic solvent, was dissolved a polyisobutylene (trade name OPPANOL N80 available from BASF Corporation) to prepare a PSA composition A1.

(PSA Composition A2)

In a reaction vessel equipped with a condenser, nitrogen inlet, thermometer and stirrer, a monomer mixture containing 50 parts of 2-ethylhexyl acrylate, 50 parts of n-butyl acrylate, 5 parts of acrylic acid and 1 part of 2-hydroxyethyl acrylate was allowed to undergo solution polymerization at 60° C. for 6 hours under nitrogen flow, in toluene as the polymerization solvent, using 2,2'-azobisisobutyronitrile as the polymerization initiator, to obtain a toluene solution of acrylic polymer (30% solid). To the toluene solution, to 100 parts of the acrylic polymer in the solution, was admixed 0.5 part of an epoxy-based crosslinking agent (trade name TETRAD C available from Mitsubishi Gas Chemical Co., Inc.) to prepare a PSA composition A2.

(PSA Composition A3)

The amount of the epoxy-based crosslinking agent used to 100 parts of the acrylic polymer was changed to 2 parts. Otherwise in the same manner as the preparation of the PSA composition A2, was prepared a PSA composition A3.

<Fabrication of PSA Sheets>

Example 1

The PSA composition A1 was applied to the adhesive face-side surface of the substrate S1 and allowed to dry at 80° C. for one minute to form a 10 μm thick PSA layer. The resultant was cut to a 60 cm long, 30 cm wide rectangular shape to obtain a non-processed PSA sheet (free of a tear-aiding structure). Here, the vertical direction of the PSA sheet was in the MD (i.e. the extrusion direction) of the substrate. Subsequently, in the central part of the non-processed PSA sheet, Pattern 1 described later was formed by machining, by a process to form a tear-aiding structure, along a rectangular tear-off line (20 cm long, 10 cm wide). A processed PSA sheet according to the present Example was thus obtained.

With respect to the PSA sheet of Example 1 and the PSA sheets according to Examples 2 to 7 and 9 to 17 below, in addition to one of Patterns 1 to 7 as a tear-aiding structure, a round through hole of 10 mm diameter was also formed at each corner of one edge of the length direction (one widthwise edge) of each PSA sheet as a positioning assistant.

Examples 2 to 8

Instead of Pattern 1, the patterns shown in Table 1 were formed. Otherwise in the same manner as Example 1, were obtained processed PSA sheets according to Examples 2 to 8.

Example 9

As Example 9, the non-processed PSA sheet was used.

Examples 10 to 14

In place of the substrate S1, the substrates shown in Table 2 were used. Otherwise in the same manner as Example 7, were obtained PSA sheets according to Examples 10 to 14.

Examples 15 to 17

The substrates and the PSA compositions shown in Table 2 were used. Otherwise in the same manner as Example 7, were obtained PSA sheets according to Examples 15 to 17.

<Machining Patterns>

(Pattern 1)

Short side (the same for each of the two sides): A 90 mm long slit was formed, leaving 5 mm at each end.

Long side (the same for each of the two sides): Two 90 mm long slits were formed, spaced apart by 10 mm, leaving 5 mm at each end.

(Pattern 2)

The tear-off line was perforated over the entire length. The length A of each cut hole forming the perforation was 3 mm and the space B between cut holes was 2 mm (i.e. A:B=1.5:1). The perforation process was carried out on the back side of the substrate, using a known perforating machine.

(Pattern 3)

A machine blade was allowed to penetrate the substrate on the back side to form a 30 μm deep incised mark over the entire length of the tear-off line.

(Pattern 4)

Short side (the same for each of the two sides): A perforation similar to Pattern 2 was formed over the entire length.

Long side (the same for each of the two sides): An incised mark similar to Pattern 3 was formed over the entire length.

(Pattern 5)

Short side (the same for each of the two sides): A perforation similar to Pattern 2 was formed over the entire length.

Long side (the same for each of the two sides): Similarly to the long side of Pattern 1, two 90 mm long slits were formed, spaced apart by 10 mm, leaving 5 mm at each end.

(Pattern 6)

Incised marks similar to Pattern 3 were formed along the tear-off line so as to connect adjacent slits in Pattern 1.

(Pattern 7)

Short side (the same for each of the two sides): A perforation similar to Pattern 2 was formed along the entire length.

Long side (the same for each of the two sides): A 10 mm long slit was formed at each end and an incised mark (180 mm long) similar to Pattern 3 was formed between the slits.

(Pattern 8)

In the rectangular tear-off line in Pattern 7, 180 mm long central stretch of each long side (i.e. where the incised mark was formed in Pattern 7) was offset 10 mm to one side of the short sides to modify the line shape so that each end of the long side central stretch (i.e. each end of the incised mark) is connected to a short side with an arc-shaped slit of 10 mm radius.

<Application (Adhesion) Test>

Using a PMMA plate (20 cm long, 10 cm wide rectangle) as the adherend, the PSA sheet according to each Example was placed with the tear-off line aligned with the circumference of the PMMA plate. The area inside the tear-off line (the protection sheet part) in the PSA sheet was press-bonded to the PMMA plate. Subsequently, by hand-holding the marginal part of each PSA sheet (a portion of the PSA sheet hanging off the PMMA plate at the other edge of the length direction, i.e. the edge on the opposite side from where the positioning assistants were formed), the PSA sheet was pulled in the length direction at an angle of about 120° to 150° to the surface of the PMMA plate, whereby the marginal part was torn off the protection sheet part. Then, the periphery of the protection sheet formed from the protection sheet part left on the PMMA plate was visually inspected. With respect to each Example, the application test was conducted three times and the performance of the PSA sheet was evaluated in the aspects described below.

(Ease of Application)

The ease of application of the protection sheet part was evaluated based on the following four grades:

E: No problem with application (excellent ease of application)

G: Some extra time taken for placement adjustments and redoing the application occasionally (good ease of application)

A: Some extra time taken for occasional attention required in handling the PSA sheet (practically acceptable ease of application)

P: Application not possible without touching the adhesive face of the protection sheet part (poor ease of application)

(Ease of Tearing)

The ease of tearing off the marginal part was evaluated based on the following grades:

E: The marginal part torn off without stopping in the middle of the operation (excellent ease of tearing)

G: Some extra time taken for occasional attention required in tearing off the marginal part (good ease of tearing)

A: Some extra time taken for the protection sheet part needed to be held down by hand while tearing off the marginal part (practically acceptable ease of tearing)

P: A cutting device needed for tearing off the marginal part (poor ease of tearing)

(Appearance of Protection Sheet)

The appearance of the periphery of each protection sheet was evaluated based on the following four grades:

E: No splinters or frays found (excellent appearance)

G: A few splinters and frays found, but not significant (good appearance)

A: Many or notably long splinters and frays found (practically acceptable appearance)

P: Protection sheet suffering damage to the circumferential shape due to splinters and frays, unable to cover the entire range of the adherend surface properly (failed appearance)

<Curved Surface Conformability>

As the adherend, was used a flat rectangular PMMA plate thermally deformed to a three-dimensional shape having a vertical curvature of 3000 mm and a horizontal curvature of 5000 mm. The non-processed PSA sheet according to each Example was cut to a 20 cm long, 10 cm wide rectangular shape. The resultant was applied to the central part of the adherend at room temperature. After 30 minutes, the state of the sheet was visually inspected. Based on the observations, the curved surface conformability was evaluated based on the following four grades:

E: No lifting of the protection sheet found anywhere in the protection sheet (excellent curved surface conformability)

G: Slight partial lifting found at the periphery of the protection sheet (good curved surface conformability)

A: Obvious partial lifting found at the periphery of the protection sheet (practically acceptable curved surface conformability)

P: Not conforming to the curved surface, peeling of the protection sheet found (poor curved surface conformability)

The results are shown in Tables 1 and 2. Tables 1 and 2 also show the peel strength of the PSA sheet according to each Example determined by the method described earlier.

TABLE 1

| | | Ex. 1 | Ex 2 | Ex 3 | Ex 4 | Ex. 5 | Ex 6 | Ex 7 | Ex. 8 | Ex. 9 |
|---|---|---|---|---|---|---|---|---|---|---|
| Substrate Configuration | Substrate | S1 | S1 | S1 | S1 | S1 | S1 | S1 | S1 | S1 |
| | Backside layer 10 μm Middle layer 20 μm Front layer 10 μm | PP/PE | PP/PE | PP/PE | PP/PE | PP/PE | PP/PE | PP/PE | PP/PE | PP/PE |
| Tensile modulus | Overall $E_T$ (MPa) | 600 | 600 | 600 | 600 | 600 | 600 | 600 | 600 | 600 |
| | Bottom $E_R$ (MPa) | 600 | 600 | 600 | 600 | 600 | 600 | 600 | 600 | 600 |
| PSA | | A1 | A1 | A1 | A1 | A1 | A1 | A1 | A1 | A1 |
| Peel strength (N/25 mm) | | 6.1 | 6.1 | 6.1 | 6.1 | 6.1 | 6.1 | 6.1 | 6.1 | 6.1 |
| Curved surface conformability | | E | E | E | E | E | E | E | E | E |
| Machining pattern | | 1 | 2 | 3 | 4 | 5 | 6 | 7 | 8 | N/A |
| Ease of application | | G | E | E | E | E | A | E | E | E |
| Ease of tearing | | E | E | A | E | E | E | E | E | P |
| Appearance of protection sheet | | G | A | G | G | G | E | G | G | — |

TABLE 2

| | | Ex 10 | Ex 11 | Ex 12 | Ex 13 | Ex 14 | Ex 15 | Ex 16 | Ex 17 |
|---|---|---|---|---|---|---|---|---|---|
| Substrate Configuration | Substrate | S2 | S3 | S4 | S5 | S6 | S1 | S7 | S1 |
| | Backside layer 10 μm | PP | PE | PE | PP | PE/PP | PP/PE | PET | PP/PE |
| | Middle layer 20 μm | PE | PP | | | PP/PE | | | |
| | Front layer 10 μm | PP | PE | | | PE/PP | | | |
| Tensile modulus | Overall $E_T$ (MPa) | 540 | 540 | 220 | 880 | 480 | 600 | 3600 | 600 |
| | Bottom $E_R$ (MPa) | 880 | 220 | 220 | 880 | 350 | 600 | 3600 | 600 |
| PSA | | A1 | A1 | A1 | A1 | A1 | A2 | A2 | A3 |
| Peel strength (N/25 mm) | | 5.8 | 6.4 | 6.8 | 5.6 | 6.1 | 3.4 | 3.8 | 1.8 |
| Curved surface conformability | | E | E | E | G | E | E | A | G |

TABLE 2-continued

|  | Ex 10 | Ex 11 | Ex 12 | Ex 13 | Ex 14 | Ex 15 | Ex 16 | Ex 17 |
|---|---|---|---|---|---|---|---|---|
| Machining pattern | 7 | 7 | 7 | 7 | 7 | 7 | 7 | 7 |
| Ease of application | E | E | E | E | E | E | E | E |
| Ease of tearing | E | E | E | E | E | E | E | A |
| Appearance of protection sheet | G | A | A | G | G | G | G | G |

As shown in Tables 1 and 2, with respect to the PSA sheets of Examples 1 to 8 and 10 to 17 having tear-aiding structures along the tear-off lines, all exhibited practically acceptable or higher levels of ease of application and ease of tearing. Particularly good ease of tearing was observed with PSA sheets having machining patterns with cut holes at the tearing start edges. The PSA sheet of Example 17 having low peel strength was susceptible to lifting of the protection sheet part during tearing of the marginal part, showing a tendency to require a longer work time as compared to other PSA sheets featuring the same machining pattern.

In studies using the substrate S1, with PSA sheets having two slits per lateral side and PSA sheets having grooves (incised marks) as the tear-aiding structure at lateral sides of their tear-off lines (rectangles), nice-looking protection sheets were formed. A particularly great appearance was obtained in Example 6 provided with a tear-aiding structure having both slits and grooves at the lateral sides. With respect to the PSA sheet according to Example 2, due to the presence of several non-processed segments between perforated holes at the lateral sides, somewhat many frays were observed at the periphery of the protection sheet. In Example 11, splinters were observed at the lateral sides of the protection sheet. In Example 12, splinters were observed at the lateral sides and frays at both the tearing start edge and the tearing finish edge. However, these were not too extensive to impair the protective functions of the protection sheets.

Although specific embodiments of the present invention have been described in detail above, these are merely for illustrations and do not limit the scope of the claims. The art according to the claims includes various modifications and changes made to the specific embodiments illustrated above.

REFERENCE SIGNS LIST

1 PSA sheet
1A adhesive face
1B back face
2 protection sheet part
3 tear-off line
3A, 3C short sides
3B, 3D long sides
4 marginal part
10 substrate
10A first face
10B second face (back face)
12 front layer
14 middle layer
16 back layer
30 tear-aiding structure
32 cut hole (perforation, tear-aiding structure)
34 cut hole (slit, tear-aiding structure)
36 groove (incised mark, tear-aiding structure)
36A bottom
42 positioning assistant
50 PSA layer
90 adherend (object to be protected, member)
100 PSA sheet roll
100A, 100B application units
102 separation line
120 separation-aiding structure

The invention claimed is:

1. A method for protecting a surface of an adherend comprising:
    attaching a pressure-sensitive adhesive sheet comprising a substrate which comprises a resin film and a pressure-sensitive adhesive layer placed on a first face of the substrate to the surface of the adherend, wherein
    the pressure-sensitive adhesive sheet further comprises a protection sheet part to be adhered to an adherend to protect the adherend, a marginal part bounded from the protection sheet part by a tear-off line surrounding the protection sheet part, and a tear-aiding structure provided along the tear-off line, wherein the protection sheet part exhibits a 180° peel strength of 3 N/25 mm or greater, and
    removing the marginal part from the protection sheet part by pulling the marginal part in a direction in which the pressure-sensitive adhesive sheet is peeled off the adherend and tearing the marginal part off the protection sheet part,
    wherein, prior to being attached, the pressure-sensitive adhesive sheet is wound in a roll, and the pressure-sensitive adhesive sheet comprises a plurality of the protection sheet parts serially arranged in the length direction of the pressure-sensitive adhesive sheet.

2. The method according to claim 1, wherein the tear-aiding structure comprises at least a cut hole or a groove.

3. The method according to claim 1, wherein the tear-aiding structure comprises at least a groove running along the tear-off line.

4. The method according to claim 3, wherein a bottom of the groove is formed with a resin material having a tensile modulus of 300 MPa or greater.

5. The method according to claim 1, wherein the substrate comprises a polyolefinic resin film as the resin film.

6. The method according to claim 1, comprising a plurality of application units separated by separation lines, wherein each application unit comprises the substrate, the pressure sensitive adhesive layer, the protection sheet part and the marginal part.

7. The method according to claim 1, wherein the marginal part is provided with a positioning assistant to assist positioning of the pressure-sensitive adhesive sheet.

8. The method according to claim 1, wherein the adherend to which the pressure-sensitive adhesive sheet is attached is a vehicle.

9. The method according to claim 1, wherein the adherend to which the pressure-sensitive adhesive sheet is attached is a member constituting a vehicle.

10. A method for producing a protection sheet-bearing member in which a protection sheet is adhered to the surface of the member, the method comprising:
    obtaining a pressure-sensitive adhesive sheet comprising a substrate whose primary component is a resin film and a pressure-sensitive adhesive layer placed on a first face of the substrate, wherein the pressure-sensitive adhesive sheet comprises a protection sheet part to be adhered to an adherend to protect the adherend, a marginal part bounded from the protection sheet part by a tear-off line surrounding the protection sheet part, and a tear-aiding structure provided along the tear-off line, wherein the protection sheet part exhibits a 180° peel strength of 3 N/25 mm or greater;

adhering the protection sheet part to the member; and pulling the marginal part in a direction in which the pressure-sensitive adhesive sheet is peeled off the member, thereby tearing the marginal part off the protection sheet part leaving the protection sheet part on the member, wherein, prior to being attached, the pressure-sensitive adhesive sheet is wound in a roll, and the pressure-sensitive adhesive sheet comprises a plurality of the protection sheet parts serially arranged in the length direction of the pressure-sensitive adhesive sheet.

11. The method according to claim 10, wherein the tear-aiding structure comprises at least a cut hole or a groove.

12. The method according to claim 10, wherein the tear-aiding structure comprises at least a groove running along the tear-off line.

13. The method according to claim 12, wherein a bottom of the groove is formed with a resin material having a tensile modulus of 300 MPa or greater.

14. The method according to claim 10, wherein the substrate comprises a polyolefinic resin film as the resin film.

15. The method according to claim 10, comprising a plurality of application units separated by separation lines, wherein each application unit comprises the substrate, the pressure sensitive adhesive layer, the protection sheet part and the marginal part.

16. The method according to claim 10, wherein the marginal part is provided with a positioning assistant to assist positioning of the pressure-sensitive adhesive sheet.

* * * * *